US007159125B2

(12) United States Patent
Beadles et al.

(10) Patent No.: US 7,159,125 B2
(45) Date of Patent: Jan. 2, 2007

(54) POLICY ENGINE FOR MODULAR GENERATION OF POLICY FOR A FLAT, PER-DEVICE DATABASE

(75) Inventors: Mark A. Beadles, Hilliard, OH (US); William S. Emerick, Dublin, OH (US); Kevin A. Russo, Lewis Center, OH (US); Kenneth E. Mulh, Upper Arlington, OH (US); Raymond J. Bell, Mill Valley, CA (US)

(73) Assignee: Endforce, Inc., Dublin, OH (US)

( * ) Notice: Subject to any disclaimer, the term of this patent is extended or adjusted under 35 U.S.C. 154(b) by 708 days.

(21) Appl. No.: 10/219,236

(22) Filed: Aug. 13, 2002

(65) Prior Publication Data

US 2003/0154404 A1    Aug. 14, 2003

Related U.S. Application Data

(60) Provisional application No. 60/312,395, filed on Aug. 14, 2001.

(51) Int. Cl.
  *G06F 9/24* (2006.01)
(52) U.S. Cl. .................................. 713/193; 713/168
(58) Field of Classification Search ................ 713/200, 713/201, 193, 168
  See application file for complete search history.

(56) References Cited

U.S. PATENT DOCUMENTS

| 5,349,643 | A |   | 9/1994  | Cox et al. |
| 5,838,907 | A |   | 11/1998 | Hansen |
| 5,870,561 | A | * | 2/1999  | Jarvis et al. ................. 709/238 |
| 5,870,605 | A |   | 2/1999  | Bracho et al. |
| 5,872,928 | A |   | 2/1999  | Lewis et al. |
| 5,889,953 | A | * | 3/1999  | Thebaut et al. ............. 709/221 |
| 5,905,900 | A | * | 5/1999  | Combs et al. .............. 713/320 |
| 5,987,611 | A |   | 11/1999 | Freund |
| 6,167,445 | A |   | 12/2000 | Gai et al. |

(Continued)

OTHER PUBLICATIONS

R Chaudhury et al., "Directory Schema for Service Level Administration of Differentiated Services and Integrated Services in Networks" draft submitted to Directory Enabled Networks Ad Hoc Working Group, Jun. 28, 1998, pp. 1-17.

(Continued)

*Primary Examiner*—Thomas R. Peeso
(74) *Attorney, Agent, or Firm*—Townsend and Townsend and Crew LLP

(57) ABSTRACT

A policy engine in a policy-based, outsourced, network management system. In one embodiment, the management system is multi-layered, modular and stores device configuration data in non-device specific format, which are subsequently translated to device-specific format by lower layers of the management system. The non-device specific format is the same (e.g., XML) as that used to create the policies with the user GUI (e.g., browser) and transport them to the service center over the internet. A database stores a policy directory in a hierarchical format that is separate from a policy store (configuration store) for devices in a flat (non-hierarchical or parallel) format. In one embodiment, a policy engine develops policies in a hierarchical format, but then stores the device schema, or objects, in a low-level, flat database. Multiple hierarchical services which impact a single device have the characteristics related to that device knitted together, and then fed back to a policy store database as a flat file for that device, in a non-device specific format. Thus, instead of storing the policies separately, and in hierarchical linked format, the device descriptions are stored with the aspects of all policies that affect that device.

28 Claims, 9 Drawing Sheets

U.S. PATENT DOCUMENTS

| | | |
|---|---|---|
| 6,170,009 B1 | 1/2001 | Mandal et al. |
| 6,327,660 B1 | 12/2001 | Patel |
| 6,330,560 B1 | 12/2001 | Harrison et al. |
| 6,393,474 B1 * | 5/2002 | Eichert et al. .............. 709/223 |
| 6,452,915 B1 | 9/2002 | Jorgensen |
| 6,463,470 B1 | 10/2002 | Mohaban et al. |
| 6,466,984 B1 | 10/2002 | Naveh et al. |
| 6,505,244 B1 | 1/2003 | Natarajan et al. |
| 6,539,427 B1 | 3/2003 | Natarajan et al. |
| 6,539,483 B1 | 3/2003 | Harrison et al. |
| 6,577,597 B1 | 6/2003 | Natarajan et al. |
| 6,584,502 B1 | 6/2003 | Natarajan et al. |
| 6,590,885 B1 | 7/2003 | Jorgensen |
| 6,611,863 B1 | 8/2003 | Banginwar |
| 6,725,260 B1 | 4/2004 | Philyaw |
| 6,751,729 B1 | 6/2004 | Giniger et al. |
| 6,771,661 B1 | 8/2004 | Chawla et al. |
| 6,820,121 B1 | 11/2004 | Callis et al. |
| 6,829,250 B1 | 12/2004 | Voit et al. |
| 6,915,436 B1 | 7/2005 | Booth et al. |
| 6,918,039 B1 | 7/2005 | Hind et al. |
| 6,922,724 B1 | 7/2005 | Freeman et al. |
| 2003/0107950 A1 | 6/2003 | Craycraft et al. |
| 2003/0163727 A1 | 8/2003 | Hammons et al |
| 2003/0182431 A1 | 9/2003 | Stumioto et al |
| 2004/0030771 A1 | 2/2004 | Strassner et al. |
| 2004/0044891 A1 | 3/2004 | Hanzlik et al. |
| 2005/0132229 A1 | 6/2005 | Zhang et al. |
| 2005/0278528 A1 | 12/2005 | Fortin et al. |

OTHER PUBLICATIONS

Herscovitz, Eli "Secure virtual private networks: the future of data communications", John Wiley and Sons, N.Y. N.Y Jul. 4-Aug. 1999 vol. 9, Issue 4, pp. 213-220.

* cited by examiner

POLICY ENGINE FOR MODULAR GENERATION OF POLICY FOR A FLAT, PER-DEVICE DATABASE

CROSS-REFERENCE TO RELATED APPLICATIONS

This application is related to copending application Ser. No. 10/219,096, "Selection And Storage Of Policies In Network Management", Ser. No. 10/219,187, "Event Management For A Remote Network Policy Management System", Ser. No. 10/219,091, "Device Plug-In System For Configuring Network Devices Over A Public Network" and Ser. No. 10/219,142, "Modular Remote Network Policy Management System", all filed even date herewith and assigned to the same assignee, and all incorporated herein by reference.

Statement as to Rights to Inventions Made Under Federally Sponsored Research or Development

NOT APPLICABLE

Reference to a "Sequence Listing," a Table, or a Computer Program Listing Appendix Submitted on a Compact Disk.

NOT APPLICABLE

BACKGROUND OF THE INVENTION

The present invention relates to management and control of communication networks and, in particular, to policy generation for remote management and control of communication networks.

Networks

A communication network typically includes a number of network devices that, among other functions, transmit or receive data. A local area network, commonly referred to as a LAN, is a privately owned network that facilitates communication among the devices coupled to the network via one of several data communication protocols such as Ethernet or FDDI. Multiple LANs are typically interconnected via, for example, private links or satellite transmissions to form a wide area network, commonly referred to as a WAN. Such LANs and WANs are increasingly being coupled to the internet.

Communication network systems are becoming ever more complex. To increase resource sharing and facilitate their supervision, computer systems, such as facsimile machines, desktop computers, printers, etc., are typically coupled to a LAN. The complexity that arises as a result of increasing the number and the variety of systems, which in the aggregate form a computer network, coupled with the variety of communication protocols that such devices are required to support, increase the knowledge base that is often required to manage such networks. The problem is further compounded by the increasing complexity of new generation of high performance network devices and their interoperability as well as by the lack of qualified and well-trained network administrators. To operate and conform to a network's objectives, a network device (e.g. a router) is first configured—i.e., the networking parameters of the device are set to desired values. An inventory as well as a record of the configuration parameters of each configured networked device is typically maintained for future reference. Network devices are often reconfigured (e.g., by changing router ports, routing tables, IP addresses) to accommodate for network expansion or modification—for example, to add a new user to the network.

Device Based Network Management

One conventional method of configuring a networked device is to issue commands which are specific to the device via a computer system. A drawback of the method is that each networked device is configured and subsequently verified separately to ensure its conformity with the desired network objectives. Another drawback of the method is that it requires an extensive knowledge base—of the various network device types—which may become prohibitively large as the number of device types in a network rises.

Outsourcing Network Management

Another known method for managing a communications network is through outsourcing the network management to another commercial entity. For example, WorldCom Inc., located at 500 Clinton Center Drive, Clinton Miss., 39056 offers a network management service based on which a group of network administrators at WorldCom, upon receiving specific requests to manage or configure a network device, transmit related commands and data via the internet to the network device thereby to manage or configure the device. The method, however, involves human intervention and is thus inefficient and unautomated.

Policy Based Network Management

A third known method for managing networked devices is to include a number of individual devices of a given type in a policy domain and apply a set of policies to the domain. Such policy-based methods, however, are only applicable to a limited number of specific device types. Furthermore, in such conventional policy-based network communication systems, policies are defined through a descriptive programming language. The applied policies so defined become attributes of their associated devices and are thus not objects which can be pointed to and thus viewed.

In directory-enabled policy-based network management systems, a directory serves as the central location for storing policies, profiles, user information, network configuration data, and internet protocol (IP) infrastructure data, such as network addresses and server information. Policies in directory-enabled networking (DEN) are defined in terms of rules containing conditions and actions for managing users, network resources, and services/applications.

In DEN, physical details of a network are separated from the logical attributes of the application types. DEN has many key attributes and characteristics that typically enable an associated network to be rapidly reconfigured and operate with other platforms. A directory-enabled network is typically scalable, fault-tolerant, and, preferably recognizes people and application by their associated attributes and characteristics and not by their numerical sequences, such as their IP addresses.

Data stored in the directory of a directory-enabled network are typically in formats derived from standard schemas based on the DEN specification published by a group of companies which are collectively known as the Distributed Management Task Force (DMTF). A schema is a collection of rules defining the relationships among objects representing users, applications, network elements, and network services. Each schema contains rules which govern the organization and logical representation of the schema objects.

Access to directory in DEN is commonly governed by version 3 of the known lightweight directory access protocol (LDAPv3), which is a stripped down version of the X.500 directory services standard.

In a directory-enabled network, network entities and the relationship between such network entities are governed by an information system, known in the art as the common information model (CIM). A CIM contains rules regarding management of, for example, hardware, operating systems, operations, application installation and configuration, security, identity, etc. The CIM which is also defined by the DMTF is a standard object-oriented model that represents objects in terms of instances, properties, relationships, classes and subclasses. A primary goal of the CIM is to present a consistent view of managed networks independent of the protocols and data formats supported by the various devices in and applications running on the networks.

One known directory serving as the central storage location in a directory-enabled network is the Windows 2000 Active Directory™, which is developed by and is available from Microsoft Corporation located at One Microsoft Way, Redmond, Wash., 98052. In addition to serving as the cental policy store, Windows 2000 Active Directory™ provides a framework for, among other function, publishing network services, managing users, computer systems, applications and services, as well as secure intranet and internet network services. Furthermore, Windows 2000 Active Directory™ provides a backbone for distributed security in Windows 2000 and a central service point for administrators to manage network services. Windows 2000 Active Directory™, which is an effective platform for DEN, is based on standard protocols such as Domain Name System (DNS)—which is used to locate servers running Active Directory—LDAPv3 (described briefly above) and Kerberos—which is a security protocol for logon authentication.

The Windows 2000 Active Directory™ includes a schema with definitions for every object class that exists in the directory service. Therefore, the universe of objects that may be represented in the Active Directory™ is extensible. Other information related to the Windows 2000 Active Directory™ features and functions are available from Microsoft corporation. The Active Directory supports Component Object Model (COM) features. COM is a language independent standard that promotes object oriented programming by specifying the interfaces of a component at the binary level.

As stated above, conventional methods of configuring and maintaining a communication network are costly, time-consuming and require expert administrators capable of reliably managing and controlling ever more complex network systems in a timely manner.

BRIEF SUMMARY OF THE INVENTION

The present invention is directed to a policy engine in a policy-based, outsourced, network management system. In one embodiment, the management system is multi-layered, modular and stores device configuration data in non-device specific format, which are subsequently translated to device-specific format by lower layers of the management system. The non-device specific format is the same (e.g., XML) as that used to create the policies with the user GUI (e.g., browser) and transport them to the service center over the internet. A database stores a policy directory in a hierarchical format that is separate from a policy store (configuration store) for devices in a flat (non-hierarchical or parallel) format.

In one embodiment, the directory includes a number of objects which describe attributes of network policy. Thus, instead of managing network policy as an attribute of a device object, network policy is modeled as separate schema objects which are orthogonal to device objects. This allows a non-expert in network devices to manipulate network policies, and also allows the modeling of very complex network policy relationships.

In one embodiment, a policy engine develops policies in a hierarchical format, but then stores the device schema, or objects, in a low-level, flat database. Multiple hierarchical services which impact a single device have the characteristics related to that device knitted together, and then fed back to a policy store database as a flat file for that device, in a non-device specific format. Thus, instead of storing the policies separately, and in hierarchical linked format, the device descriptions are stored with the aspects of all policies that affect that device.

In one embodiment, a policy generator receives notification of a policy adoption/change from an event manager. The policy generator extracts the policy rules, and divides them according to type. The rules are then sent to an appropriate policy service agent, along with an XML template and a server address for the hierarchical policy directory. The policy service agents are COM servers that query the policy directory as necessary to populate the XML template and return it to the policy generator. The policy service agents include ones for (1) Virtual Private Network (VPN), (2) Network Address Translation (NAT), (3) firewall, and (4) Application Management Services (AMS).

In one embodiment, the policy generator concatenates together, for each device, the populated XML templates returned from the policy service agents. This concatenation is done using an XSL stylesheet. Merging and normalization is done after policy generation is completed to retain the modular independence of each XML template. The device attributes from the directory are appended, and the result is stored in a policy (configuration) store database. By not sending the device attributes to the policy service agents, one avoids sending data not required by the policy service agents.

In one embodiment, separate modules are provided for tasks that need to be coordinated between different policy service agents. An authorization and key manager module is called by the VPN and firewall PSAs to assigned encryption keys and passwords, to ensure the same ones are used. A status tracking system module tracks the status of what the policy generator has done to maintain consistency in the event of interruptions before completion.

In one embodiment, a registry of PSAs is maintained. The system is modular and expandable, and a new PSA can be defined and added to the registry.

In one embodiment, the policy generator is implemented with a main thread and a policy generation thread pool. The main thread spawns the other threads. Each thread in the thread pool is responsible for policy for a particular policy object. The main thread maintains an ActiveX® Data Objects (ADO) pool, which provides an application level interface to an OLEDB provider (a set of interfaces to the configuration store).

DETAILED DESCRIPTION OF THE INVENTION

A. Overview of the Operational Stages of the System

The present invention provides policy-based outsourced network management system at a service center and thus manages and controls a communication network having multiple network device types over a network (e.g., the internet). The management of a typical communications system by the outsourced management system of the present invention is briefly shown in FIGS. 1A–1F, described below.

Figure 1A:
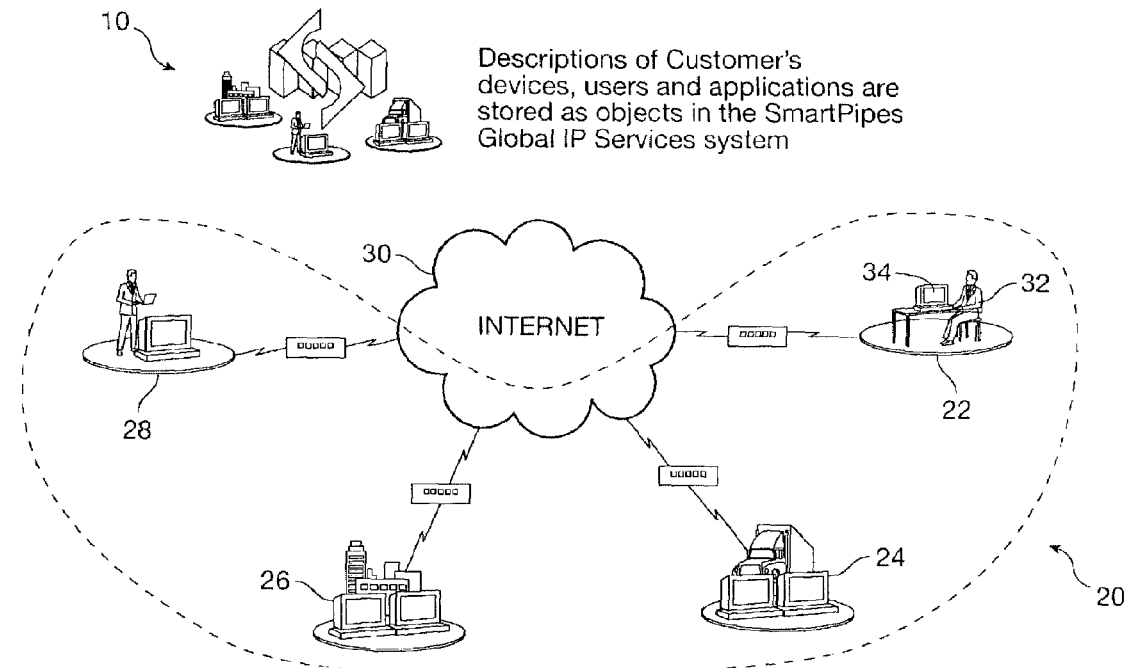
FIGS. 1A–1F show a client network communications system being managed by the policy-based network management system, in accordance with one embodiment of the present invention.

FIG. 1A shows a customer communications network 20 (shown inside the dashed perimeter lines and composed of network service points 22, 24, 26 and 28) that is coupled to the management system 10 via internet 30. Each network service point may include a number of network devices, such as routers, hubs, printers, facsimile machines, computer systems, etc. In FIG. 1A, internet 30 is shown as the communications medium via which customer 32 using his computer system 34 communicates with management system 10. The customer's devices are stored as objects in the management system 10.

Figure 1B:
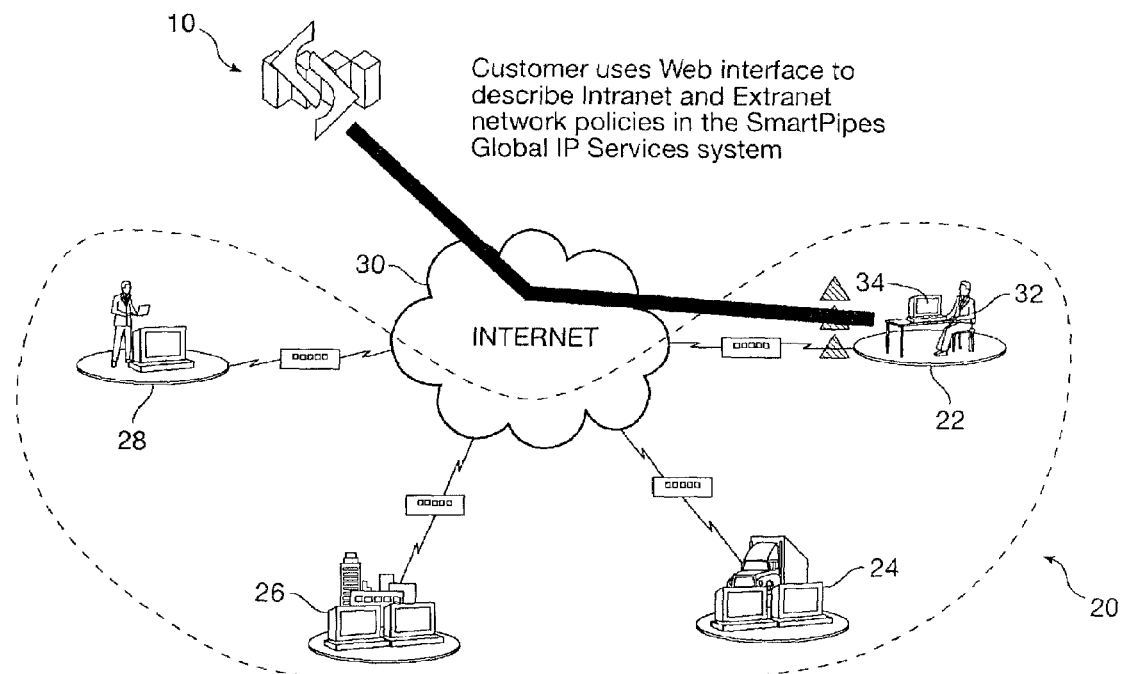

Next, as shown in simplified FIG. 1B, the customer describes intranet and extranet policies for configuring the network communications system 20 under the control and management of system 10. Customer 32 uses a graphical user interface (GUI) on his/her computer system 34, such as an internet browser. The customer describes network policies using the browser, then provides them over the internet to management system 10.

Figure 1C:
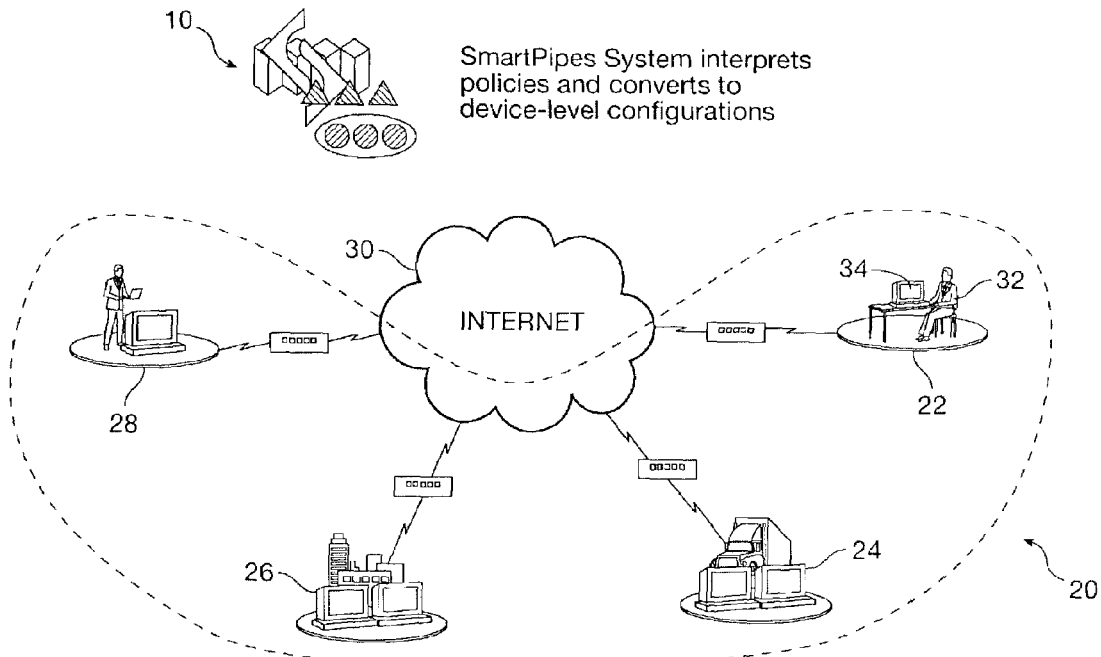

Next, as shown in simplified FIG. 1C, system 10 interprets and converts the selected network policies to device-level configuration data and stores the configuration data in a directory.

Figure 1D:
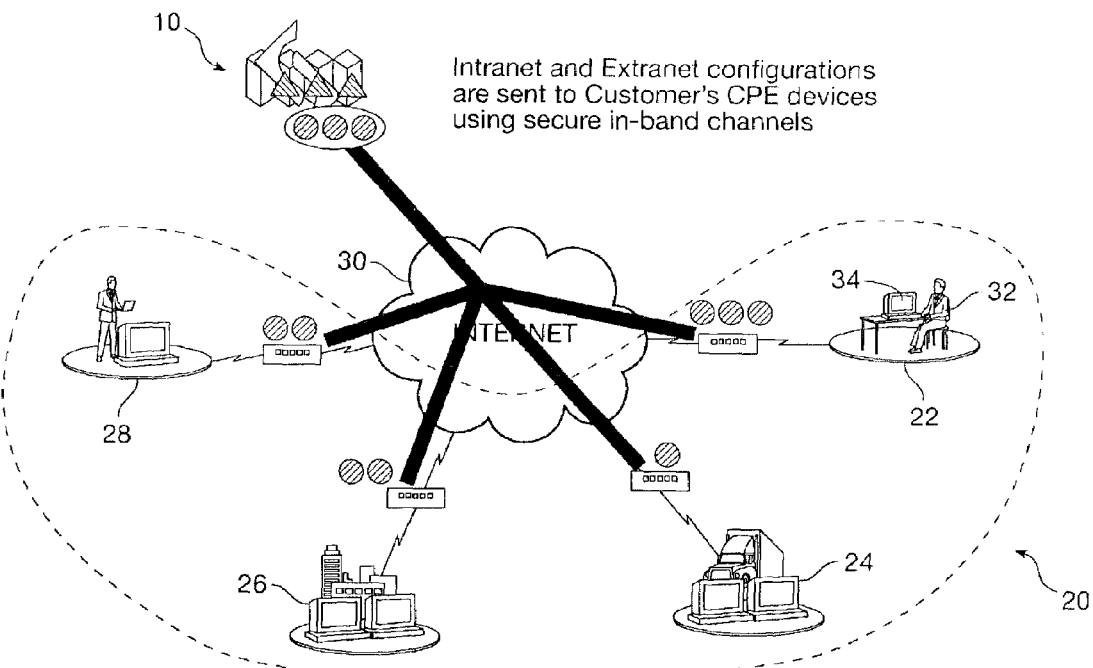

Next, as shown in simplified FIG. 1D, system 10 via the internet 30 and using a secure channel, applies the selected intranet and extranet policies to configure the network devices disposed in each of the network service points 22, 24, 26, and 28 to thereby bring the communication network 20 under its control.

Figure 1E:
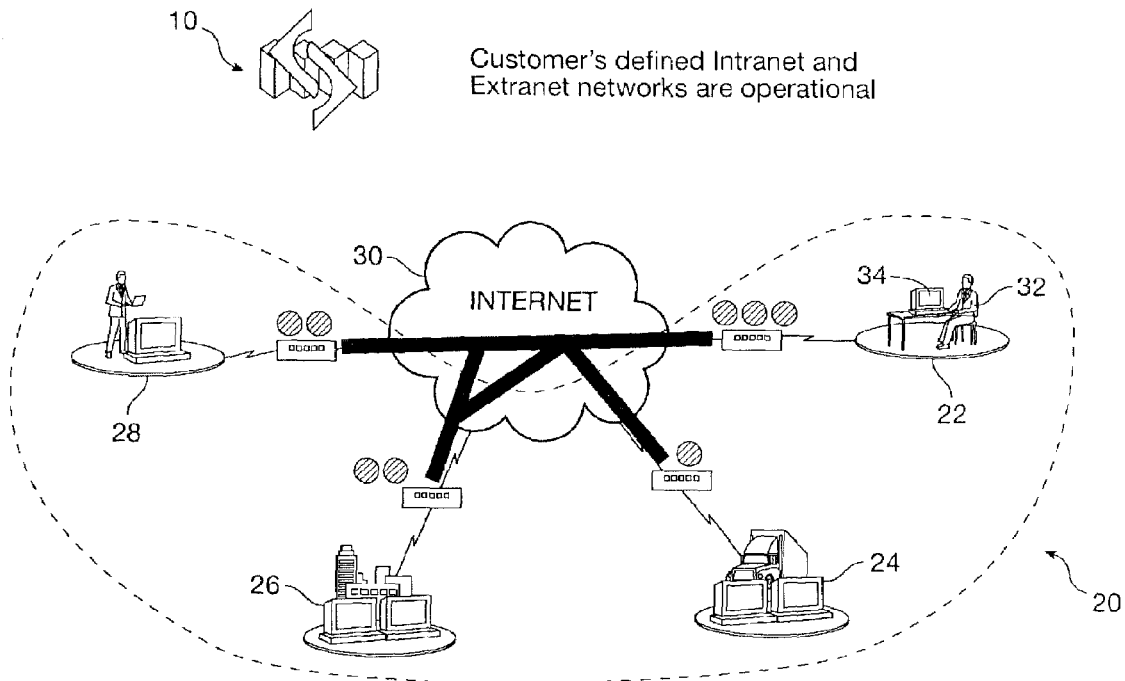

FIG. 1E shows that the system 10 has completed configuration of communications network 20, which therefore may carry out its intranet and extranet policies in accordance with the adopted policies.

Figure 1F:
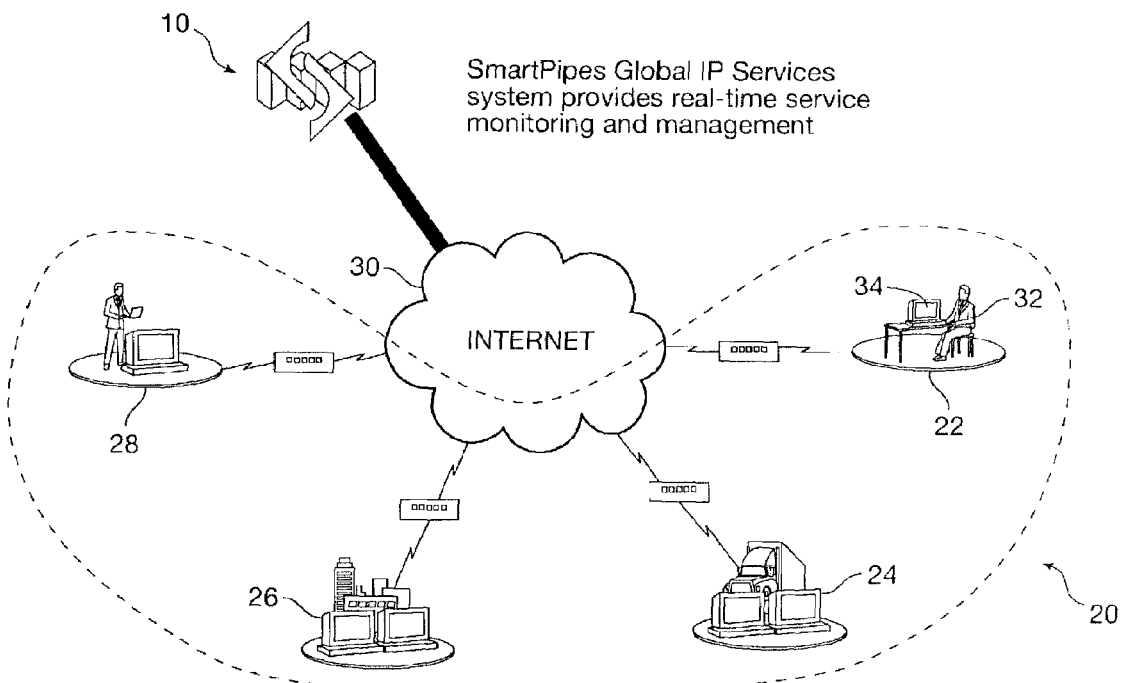

FIG. 1F shows that after configuring the network devices and applying the network policies, system 10 continues to monitor and manage network communications system 20 via internet 30.

B. System Overview

Figure 2A:
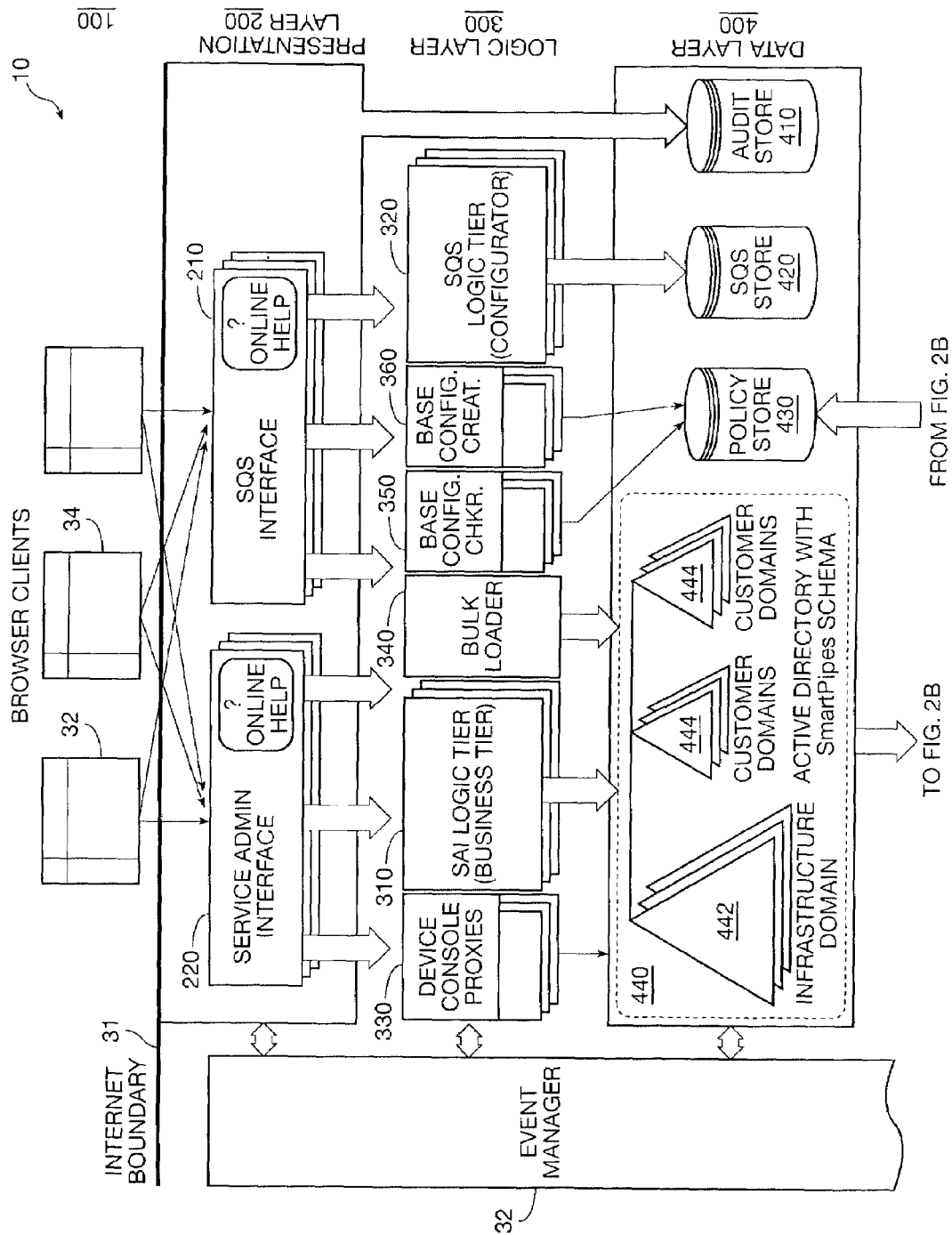
FIGS. 2A and 2B show various layers of the policy-based network management system of FIG. 1.
Figure 2B:
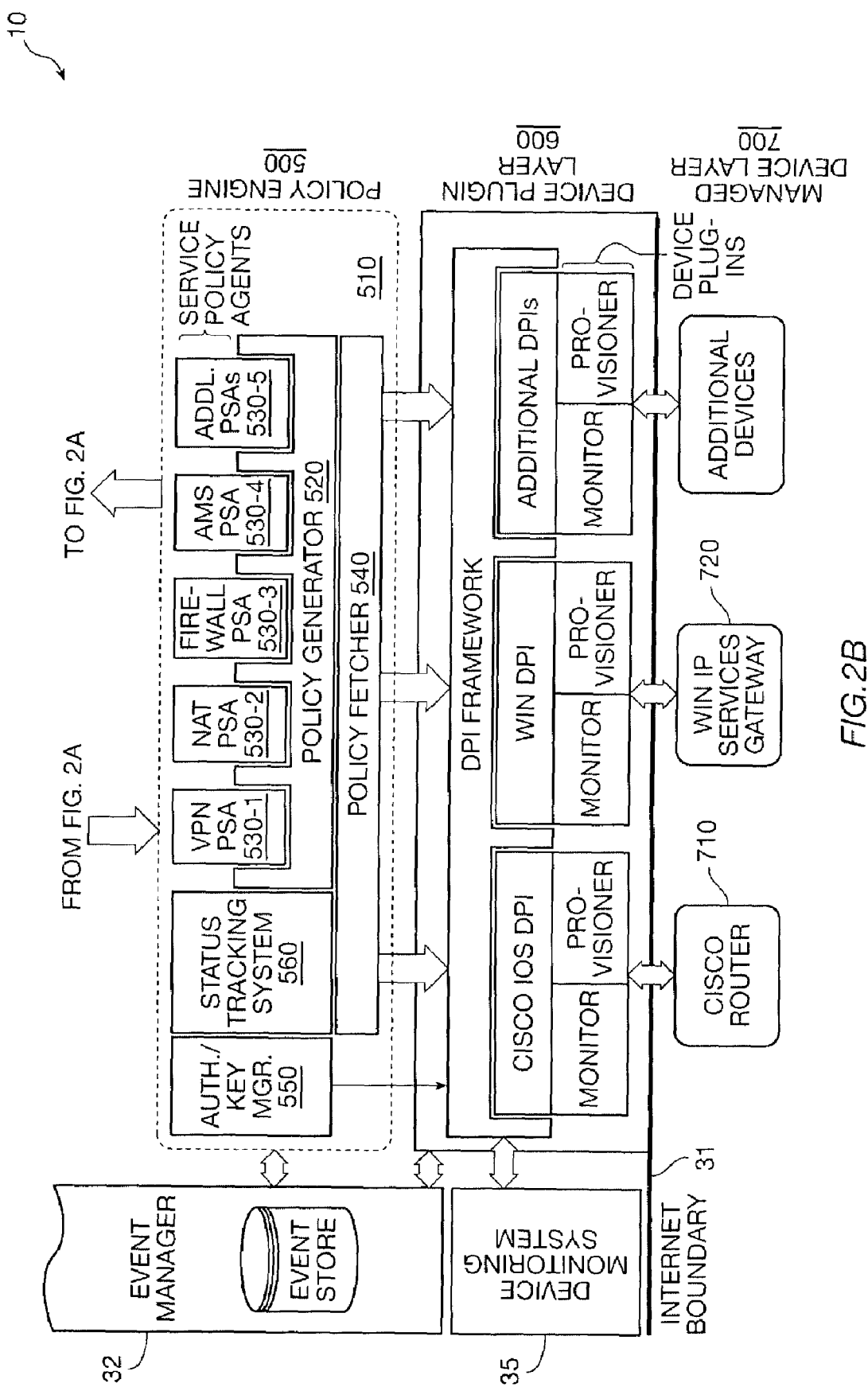

FIGS. 2A and 2B show simplified block diagrams of various layers of management system 10 of FIGS. 1A–1F, in accordance with one embodiment of the present invention. System 10 operates in accordance with a global policy service architecture and includes seven layers, namely, a client layer 100, a presentation layer 200, a logic layer 300, a data layer 400, a policy layer 500, a device plug-in layer 600 and a managed devices layer 700. System 10, also includes, among other modules, an event manager 32 and a device monitoring system 35. System 10 configures, monitors, and controls (i.e., manages) network devices, such as Cisco router 710 and Windows IP Services Gateway 720—in managed devices layer 700—via the internet 31.

System 10 provides a framework for describing internet protocol (IP) services by adopting network policies and managing the network devices (hereinbelow alternatively referred to as managed devices) in layer 700, in accordance with the adopted policies. System 10 is a data-center-based service architecture composed of an array of interacting software, network, and data store elements. System 10 is a dynamic, multi-layered, distributed architecture, and is secure and expandable.

To configure a network device and select and deploy network policies, a user first supplies information regarding his/her network devices (such as the devices' types, model numbers, IP addresses, base configuration data), as well other administrative information (e.g., a contact person at the user's company) to system 10 in one of the following two ways. The user may identify his/her network devices graphically and via an internet browser from various lists that system 10 displays to the user. System 10 collects the user data so identified and stores them in an XML file. Alternatively, the user may create an XML file containing such network identification data and transport that XML file directly to system 10 via the internet. It is understood that when a communication medium other than the internet is used, the user uses a GUI other than an internet browser and may use a file format other than the XML format. It is also understood that the user may create a file using a format other than the XML and which is directly viewable and transportable over the internet. The XML data identifying network devices—supplied by either of the above two methods—is subsequently converted to hierarchical data and written to an Active Directory™ 440.

Next, using a web browser, the user navigates through various policy lists—displayed to the user by system 10—from which lists the user selects and deploys network policies. The selected policy data are stored in Active Directory™ 440. Next, a policy engine in policy layer 500 retrieves policy data stored hierarchically in the Active Directory™ 440, knits different service-based policies together, converts the knitted policies from hierarchical to flat XML format, and thereafter stores the XML policy data which are service-based and device-neutral in policy store 430. Subsequently, an associated device plug-in residing in device plug-in layer 600 of system 10 receives the XML data—stored in the policy store—via the policy engine, translates the XML data to device-specific configuration data and, thereafter, transfers the device-specific configuration data to its associated network device thereby to configure the device and deploy the policies.

C. Data Layer

Data Layer 400 in FIG. 2A includes an active directory 440, a policy store 430, and SQS store 420, and an audit store 410. The present invention uniquely provides a hierarchical policy representation and directory 440, which is then translated and stored in a per-device flat file format in policy store 430.

Policy Store

The policy store, like the other databases, is implemented as a Microsoft SQL server database. The policy store consists of clustered, replicated, optimized SQL server databases. It fulfills requests from policy engine 500 to store, retrieve and maintain versions of policies in managed device base configurations in a distributed database. Network policy is stored on a per-device basis in an Extensible Mark-Up Language (XML) format. Information stored for each policy and base configuration is versioned and time-data stamped.

XML policy instantiations are stored in the policy store 430 using XML schema from the directory 440, described below. This schema contains tags and elements describing IP services policy, including managed device policy, IPS EC policy, firewall and NAT policy, and policy for all other managed IP services.

SQS Store 420.

The SQS (Sales Quoting System) store includes the SQS database and a knowledge base. The SQS database is used by an SQS presentation interface for persistence. The knowledge base contains rule sets and product service descriptions for use by an SQS configuration. The SQS stores are clustered, replicated SQL server databases.

Audit Store 410.

The audit store contains data and tracks user activity in SAI logic tier 310 for the purpose of auditing. Examples of the kind of data stored are which object was accessed, what type of action was performed on that object, what associated objects were affected, and time and data information. The audit store consists of clustered, replicated SQL server databases.

Active Directory

Directory 440 in data layer 400 is the main store for all data related to network infrastructure, users, managed devices, applications, and policy data. Directory 430 is based on Active Directory™ schema incorporating the X.500 and DMTF DEN/CIM standard schema, as well as a number of network-adapted schema extensions according to the present invention, attached as Appendix A and as described below. Access to the directory 440 is made via either LDAPv3 or Active Directory Service Interfaces (ADSI). The hierarchical data stored in directory 440 establishes policy relationships between various entities of system 10.

Policy Schema.

In addition to the standard schema provided with the Microsoft Active Directory software, the present invention adds additional schema to support policy objects. In particular, the schema describes network policy rules, security rules, firewall rules, as well as routers such as Cisco and Lucent routers. Thus, in addition to being able to describe enterprise data in the original active directory schema (the relationship between a computer and an application or between a user and a computer), the schema extensions allow a description of the relationship between a device (eg, Cisco router) and a network policy. These network schema are additional objects added to the directory.

For example, an "actions" object is provided for indicating a prioritized list of actions maintained by it. It contains an action class attribute to indicate what type of actions the list points to. Examples of object actions in this class include an "AMSAction" object for holding information pertaining to software updates, and "IKEAction" object specific to internet key exchange (IKE) negotiation in conjunction with IPSEC. There is also an IP SEC Action object and an IPSECASet object. There is also a "Policy Action" object which acts as a container for policy actions.

Another type of object is a "policy" object which is the root policy class. This is a container for holding multiple policy rule objects. Another object is a "Policy Rule" object which is a container for relating policy actions and conditions.

Another group of objects relate to ports and interfaces. A "ports" object defines valid inbound/outbound ports for an entry point. A "application port usage list" object provides a class of objects for application port usage lists. An "interface" object is the class for logical interface for networking elements. This includes (1) interface identifier information which identifies an interface with its type, location, or other information, and (2) network relevant information such as interface speed. A complete description of the directory schema tables for the policy objects is provided at the end of this application.

Directory 440 is a single directory containing multiple domain trees of two types, namely an infrastructure domain type 442 and a customer domain type 444. Infrastructure-type domain 442 store non-company specific data such as customer profiles, billing information, standard intranet applications, managed device types and models, standard policy rule sets, standard VPN security templates, supported software versions.

Customer-type domains 444 store company-specific data such as company authentication realms, network users of the company, service groups, managed devices, custom applications, network interfaces, telecommuters and groups, business networking policies, policy conditions, custom VPN security templates, custom policy actions, pointers to managed device base configurations stored in the policy store 430. Hierarchical Data stored in the directory 440 is retrieved and converted to device-neutral XML service-based data by policy engine 510 and is subsequently stored in policy store 430.

D. Policy Layer

Policy engine layer 500 forms the fifth layer of system 10 and contains a policy engine 510, which in turn, includes a policy generator 520, a number of policy service agents (PSA) 530, a policy fetcher 540, an authentication/key manager 550, and a status tracking system 560.

D.1. Policy Generator

The Policy Generator 520, acting with each of the Policy Service Agents (PSAs) (below), is responsible for generation, normalization, and versioning of per-device XML-based network policy instantiations, and for storing the resulting XML data in the Policy Stores 430. The generation process is triggered by receipt of a policy change event from the Event Manager 32. After storing new network policy for a Managed Device, the Generator sends notification to the appropriate Device Plug-In via the Event Manager.

Policy Service Agents (PSAs) are distinct elements that operate in conjunction with the Policy Generator. Each PSA is responsible for interpreting a set of policy Schema in the Director 440, and generating per-device XML-based network policy instantiations based on the business-networking policy in the directory. Each PSA corresponds to an individual abstracted network service, for example an IPSec VPN service and a Firewall service. As new services are added, a new PSA is developed (based on a PSA framework) to interpret and generate network policy for that new service.

Figure 3:
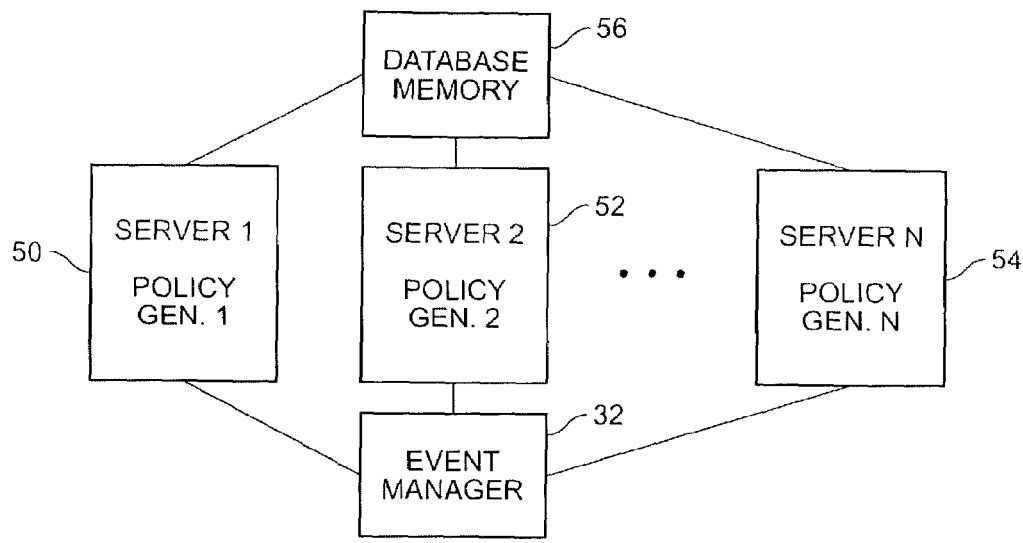
FIG. 3 is a block diagram illustrating the use of multiple servers with multiple copies of a policy generator according to an embodiment of the invention.

FIG. 3 illustrates the policy generator of the present invention on multiple servers. Shown is a first instantiation of the policy generator on a first server 50, a second instantiation on a second server 52, and an Nth instantiation on an Nth server 54. The policy generators on these different servers are controlled by event manager 32, which may be on a different server, or on one of servers 50, 52 or 54. All the servers connect to a database on a memory system 56, which may be a RAID array or other memory. The event manager can divide up the policy generation tasks for a single customer between the multiple instantiations of the policy generator, or can divide up the policy generation by customer so that a single customer has the policy generated by the same instantiation of the policy generator.

Figure 4:
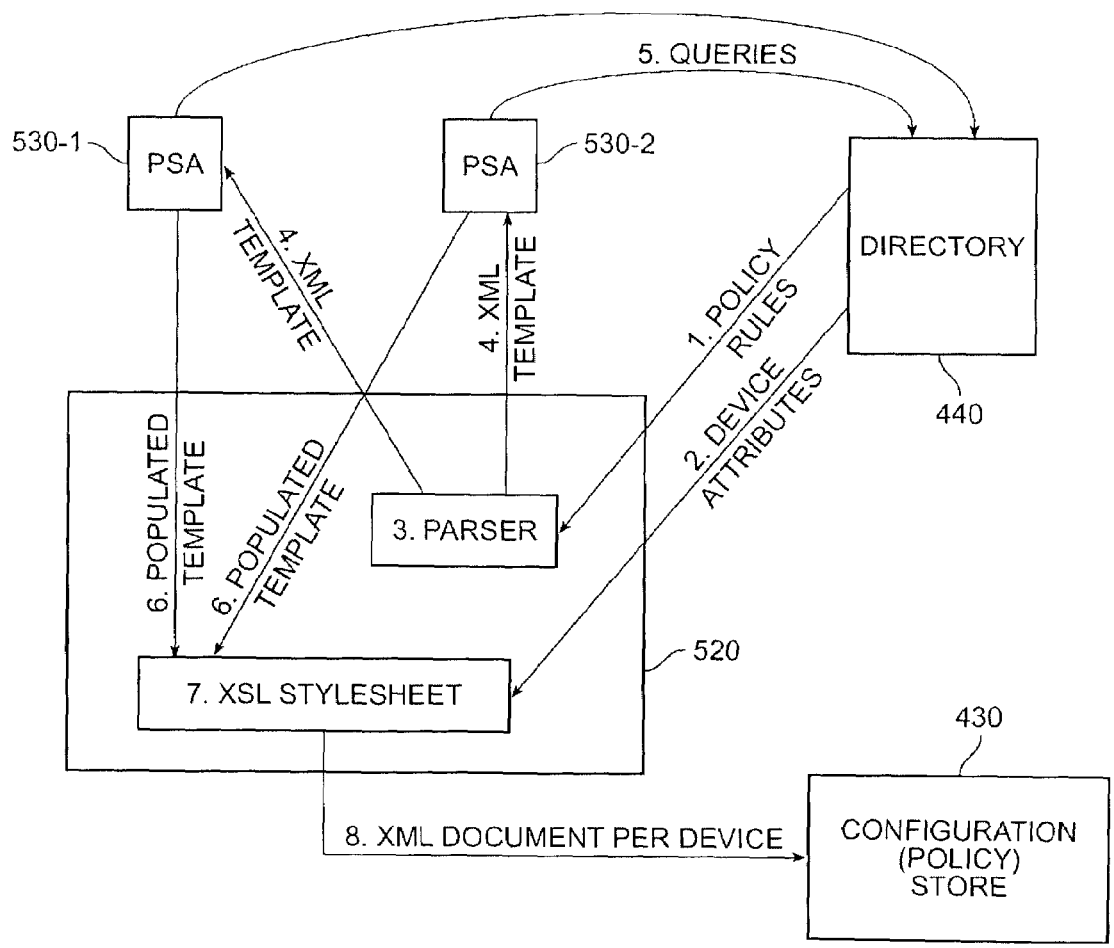
FIG. 4 is a block diagram illustrating the flow of information in one embodiment of the policy generator of the invention.

FIG. 4 illustrates the operation of the policy engine of the invention. The arrows in FIG. 2 are labeled by numbers to illustrate the sequence of steps.

(1) Policy Rules are provided from directory 440 to policy generator 520.
(2) Also provided are device attributes.
(3) The policies are parsed and
(4) the parsed policies are provided to PSAs 530-1, 530-2, etc. The provided policies include the rule description, the server address (which of the servers of FIG. 3), and an XML template.
(5) The PSAs query directory 440 for the information needed, and assemble device-level policy descriptions which are populated into the provided XML template.
(6) The populated XML template is provided back to policy generator 520.
(7) The policy generator uses an XSL style sheet to concatenate together the XML templates on a per-device basis. In addition, the device attributes previously obtained from directory 440 are appended.
(8) An XML document for each device is then provided to policy (configuration) store 430.

Figure 5:
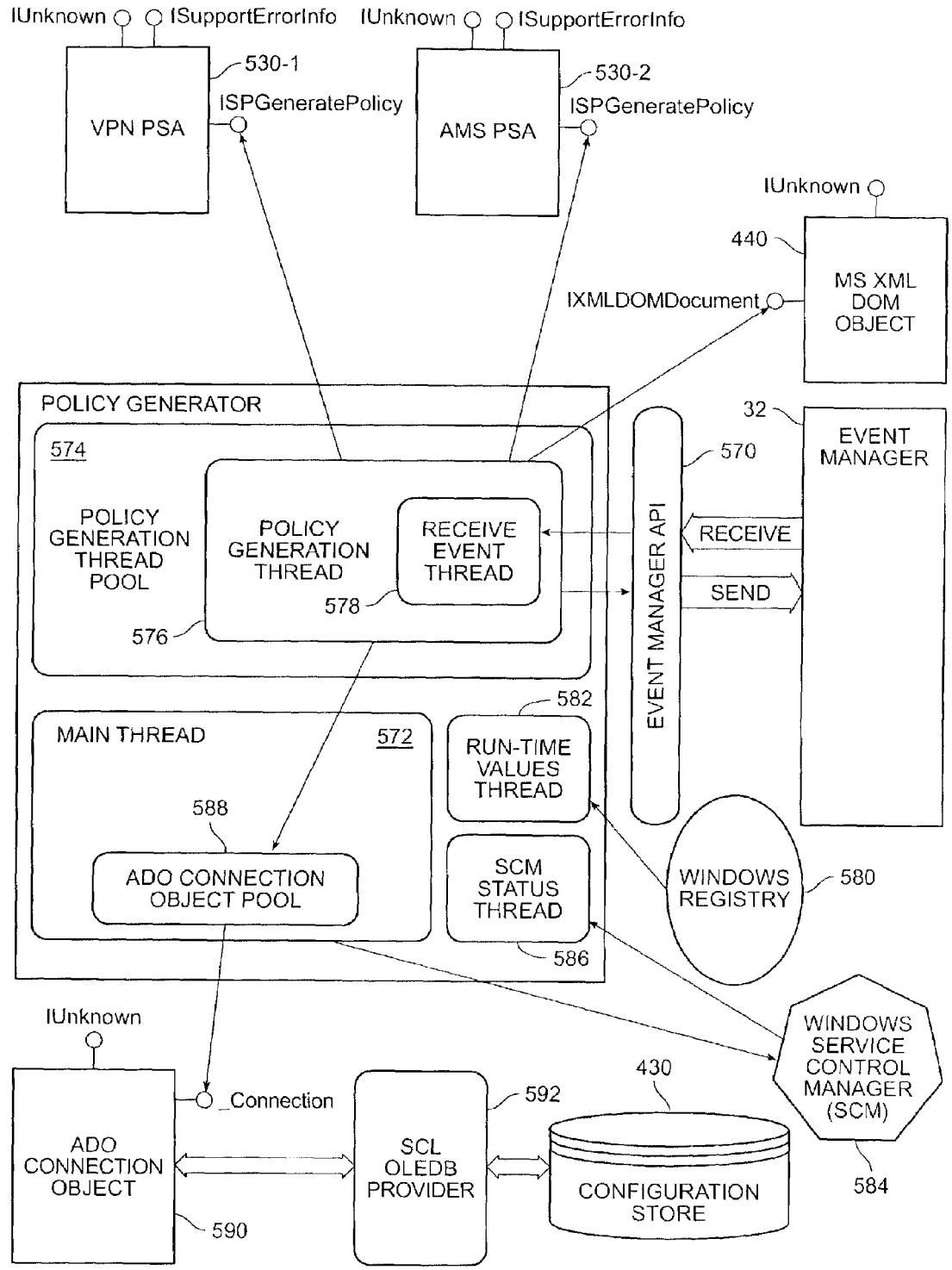
FIG. 5 is a block diagram illustrating the components and interfaces of a policy generator according to an embodiment of the invention.

FIG. 5 illustrates the use of threads by the policy generator, and more details on the interface to the configuration store. In particular, policy generator 520 interfaces with the event manager 32 through an event manager Application Program Interface (API) 570. The policy generator includes a main thread 572, which spawns a policy generation thread pool 574. A particular policy generation thread 576 in thread pool 574 is shown. Thread 576 includes a received event thread 578 which is used to receive a policy change/create event. Thread 576 then establishes communication with the appropriate one of the PSAs, such as VPN PSA 530-1 or AMS PSA 530-4. Communication, as needed, is provided with the directory 440 illustrated as an MS XML DOM object which provides a tree view of the XML documents.

A registry 580 under control of a run-time values thread 582 registers the different PSAs, and provides a mechanism for adding a new PSA. A Windows service control manager (SCM) 584 tracks the status of thread execution through an SCM status thread 586.

An ActiveX® DO(ADO) connection object pool 588 is provided in main thread 572. This connects to an ADO connection object 590 which provides an application level interface to OLEDB provider 592. The SQL OLEDB provider is a set of interfaces to configuration store 430.

The SCM 584 ensures that the policy generator 520 starts when system 10 boots up. The SCM also provides an interface to SAI 220 to stop the service if necessary. Policy generator 520, in cooperation with the PSAs, generates, versions, and stores in policy store 430, device-neutral policies on a device-by-device basis. After storing new policy for a device, policy generator 520 notifies an associated DPI Device that a policy has been generated.

Policy Generation Steps

To summarize, Policy generator 520 performs the following steps to generate a policy:

(1) Receive notification from the SAI 220 via event manager 32 that policy has been changed in directory 440 and thus must be regenerated.
(2) Generate an associated PSA object for each rule in the policy based on the rule type and require the associated PSA to generate an XML policy schema for the rule.
(3) Collect all of the XML policy schema from the PSAs, concatenate them together, sort them by device, normalize the policy to remove duplication, merge data as necessary, and generate a per device representation of the policy.
(4) Store and version each device-specific policy representation in policy store 430.
(5) Notify the associated DPI via event manager 32 that there has been a policy change.

Main thread 572 is responsible for spawning all other threads and performs all initialization sequences such as registering with the SCM. The main thread, also serves as the message pump for any COM objects that are used or implemented by the other threads.

The policy generation thread pool 574 is a pool of worker threads. Each thread is responsible for receiving policy generation events from the event manager 32 and, in response, generating a policy for the object specified in the event. The size of the pool is configurable via registry settings.

Policy Generator Interface to Configuration Store

Policy generator enables connection pooling at the OLEDB provider level, thereby allowing the physical connections between the policy generator 520 and the database server to be reused. Since the act of setting up a physical connection to the database server can be prohibitively slow, connection pooling provides a huge cost savings. Secondly, it is quite expensive to recreate ADO Connection objects again and again. So, using a pool of pre-created ADO Connection objects can greatly improve performance.

Policy generator 520 uses ADO's Command object to define all parameters necessary to call the stored procedure to, thereby, avoid multiple round trips between policy generator 520 and the database server which would otherwise be required to determine the types and sizes of parameters. The use of ADO's command by policy generator 520 results in system performance improvement.

A cluster of SQL Servers house policy store 430 in order to support fault tolerance. Policy generator 520 accesses policy store 540 via a "virtual" database server provided by the SQL Server cluster to facilitate database fault tolerance.

Policy Generation

Each policy requiring generation contains one or more policy rules. Each rule is sent to an associated PSA based on its type. The coordination between different PSAs is based on COM Asynchronous Method Calls.

A Policy change event may signal that policy has changed either at an organizational unit (OU) object level or a policy object level. If it is at the OU object level, the policy generator 520 determines all of the policies contained within the OU object and then generates XML policy schema for each. Each policy generation thread treats an event as its unit of work. Since a single thread is coordinating policy generation for a single event, policy generator 520 generates XML policy schema serially for each policy object beneath an OU object. Alternatively, XML policy schema for all policy objects may be generated in parallel.

A policy generation thread executes policy generation steps outlined below for each policy object requiring XML policy schema generation. Such steps are performed for each policy object referenced directly or indirectly in the event.

Manage Policy Generation by PSAs

Each policy object is made up of one or more policy rule objects. Each PSA generates XML policy schema for a given policy rule object. Policy generator 540 determines the policy rules included in the policy object by querying the directory 440.

Each rule has an associated rule type that defines a policy service type(s). For example, a policy may contain a VPN rule and a QoS rule. Each PSA registers with policy generator 540 the type of policy rule it is able to generate (see "Configuring a New PSA" section below). Policy generator 540 matches the rule type to the corresponding PSA that is able to generate XML policy schema for that rule. Each PSA, using its registration information, creates an instance of the PSA object, queries for the ISPGeneratePolicy interface, and calls the GenerateXMLSchema method. Accordingly, there is a PSA object instance per policy rule object.

Each policy generation thread coordinates policy generation of multiple policy rules resulting in coordination of multiple PSA objects. Since policy generation is a time-consuming process, the PSAs perform their policy generation in parallel. The Policy generation thread has an asynchronous interface to each PSA so that it can manage multiple PSAs simultaneously. Since the PSAs are COM components, they support COM's asynchronous method call support, thereby, allowing the thread to begin Policy Generation on a number of PSA objects at the same time. The asynchronous method call infrastructure also provides a mechanism for canceling the method calls if necessary.

XML Definition

There are multiple types of XML schemas. One is the device schema which is stored in policy store 430. Another is a VPN policy rule schema which is populated by the VPN PSA and is returned to policy generator 540.

Sort by Device/Merge/Normalize

After the policy generation thread retrieves the XML document created by each PSA, the XML policy rule documents are concatenated and placed into a collection of device-specific XML documents using XSL stylesheets. To achieve this, first policy generator 540 applies an XSL stylesheet to the document to sort it by device. Next, policy generator 540 applies an XSL stylesheet to merge data. Next, using another XSL stylesheet, policy generator 540 normalizes out any duplicate data. Next, using the final XSL stylesheet, policy generator 540 creates new device-level XML documents as defined by the XML device schema definition above.

In order to isolate the various functions related to sorting, merging and normalizing, the XSL templates are applied to the XML DOM object rather than to the schema directly. Such isolating eliminates changes in policy generator when, for example, the sorting, merging, or normalizing rules are changed, thereby requiring only the XSL templates to be modified.

Each PSA may generate schema that are subsequently normalized after being grouped by device. A duplicate schema may require removal after the rule level documents are grouped by device. For example, an IKE rule policy schema within a VPN policy rule schema must be removed. The IKE policy represented by the SP-IKE policy entity is applied to a managed edge device at a device level and not at an interface level. Since there may be multiple copies of the same IKE policy (identified by the mini-GUID attribute) within the policy rules related to a single managed device, the XSL normalize all IKE policy instances into one.

Each PSA may generate schema that is required to be merged after it is grouped by device. An example of schema that is required to be merged together after the rule level documents are grouped by device is the interface within the VPN policy rule schema. There could exist the same SP-Interface entity (identified by the baseConfigName attribute) in many policy rules for the same device. Each SP-Interface will contain one or more SP-MapEntryRef entities that reference SP-MapEntry entities within the IPSec policy. All instances of SP-Interface that have the same baseConfigName attribute are combined into one SP-Interface entity containing the SP-MapEntryRef entities from all instances.

If only a single policy is stored (i.e., the policy generation event contains a Policy DN not an OU), policy generator 540 retrieves the active policy for the device from policy store 540 and use it as the basis for the new version of XML. Once the XML is retrieved from policy store 540, policy generator 540 merges the newly generated policy schema into the existing policies. To achieve this, policy generator 540 first concatenates the old and new policy schemas. Next, it uses an XSL stylesheet to replace the old policy with the new policy using the identifier attributes on the XML entities as its keys, for example, policy generator 540 uses the baseConfigName attribute on the SP-Interface entity, the mini-GUID attribute on SP-IKE policy entity and the DN attribute on SP-IPSEC policy entity to match the two policies.

Store to Config Store

Each device-level XML document is versioned and stored in policy store 430. The policy generator 540 creates a new row for each device-level XML document in the Policy Store's policy table in accordance with the table below.

| Column Name | Value |
| --- | --- |
| policyVersionGUID | The database server will generate a unique value. |
| policyVersion | This column may be helpful as a numeric that could be auto-incremented each time that policy was generated. |
| deviceGUID | GUID of the device object in the Directory. |
| createDate | Column's default value which is current date. |
| status | Status will be Active. |
| statusDate | Column's default value which is current date. |
| policyInfo | The device-level XML document as a Unicode (UCS-2) string. |
| locationID | This is the location ID of the DataCenter from which this row was inserted. This is used for replication. The value passed to the stored procedure will actually be the "value" column of the applicationCode table that relates to this ID. The stored procedure will lookup the ID before doing the insert into the Policy table. |

Policy generator 540 receives an available Connection object from the ADO Connection object pool to execute the required SQL commands on the server. To change the policy for a device, policy generator 540 first changes to inactive the status of the policy of an active device and, thereafter, inserts the new policy as the active policy for the device. The change and insert are done within a transaction so that either both or neither of the changes are committed within the transaction to ensure that there is only one active policy per device at a time.

Notify Plug-Ins of Policy Change

Policy generator 540 uses the event manager interface, to send a policy generation event for each device that it generates a new policy. Each device object in the directory 440 has a type attribute, furthermore, each DPI in layer 600 communicates policy data to one or more device types (e.g., a Cisco Router, a Win2K Edge device). Depending on the device type, policy generator 540 generates an event of a specific type (i.e., policy change for Cisco router) and sends the event to event manager 32 using the event manager interface. Each device plug-in in layer 600 must register with event manager 32 in order to receive an associated event type. Therefore, a device plug-in is notified of a policy changes only for such devices that it is configured to communicate with.

Configuring a New PSA

Each PSA is registered with policy generator 540. The registration includes such information as the CLSID of the PSA and the type of policy rule that the PSA is able to support Policy generator operates in conjunction with the PSAs and therefore is notified when a new PSA becomes available. A PSA is added to policy generator 540's list of known PSAs without any code change to policy generator 540. Moreover, the addition of a new PSA to policy generator 540 does not require a restart of the policy generator 540 ("hot add").

The following is the list of registry entries that must be made by a PSA in order to be registered with policy generator 540.

XML policy data, and subsequently store the converted data in policy store 430.

Four such PSAs, namely a VPN PSA 530_1, a NAT PSA 530_2, a firewall PSA 530_3 and an application management service AMS PSA 530_4 are shown in FIG. 1. It is understood, however, that system 10 may include more or fewer PSAs as shown by reference numeral 530_5.

Each PSA 530, in cooperation with policy generator 520, evaluates a set of associated policy schema from directory 440, and generates a corresponding service-based device-neutral XML network policy in compliance with the deployed networking policies. Each PSA 530 is associated with a dedicated network service. For example, VPN PSA 530_1 is associated VPN-related services; similarly, firewall PSA 530_3 is associated with firewall services. Additional PSAs are optionally included in system 10 as the need for their respective services arises.

Common PSA Features

Figure 6:
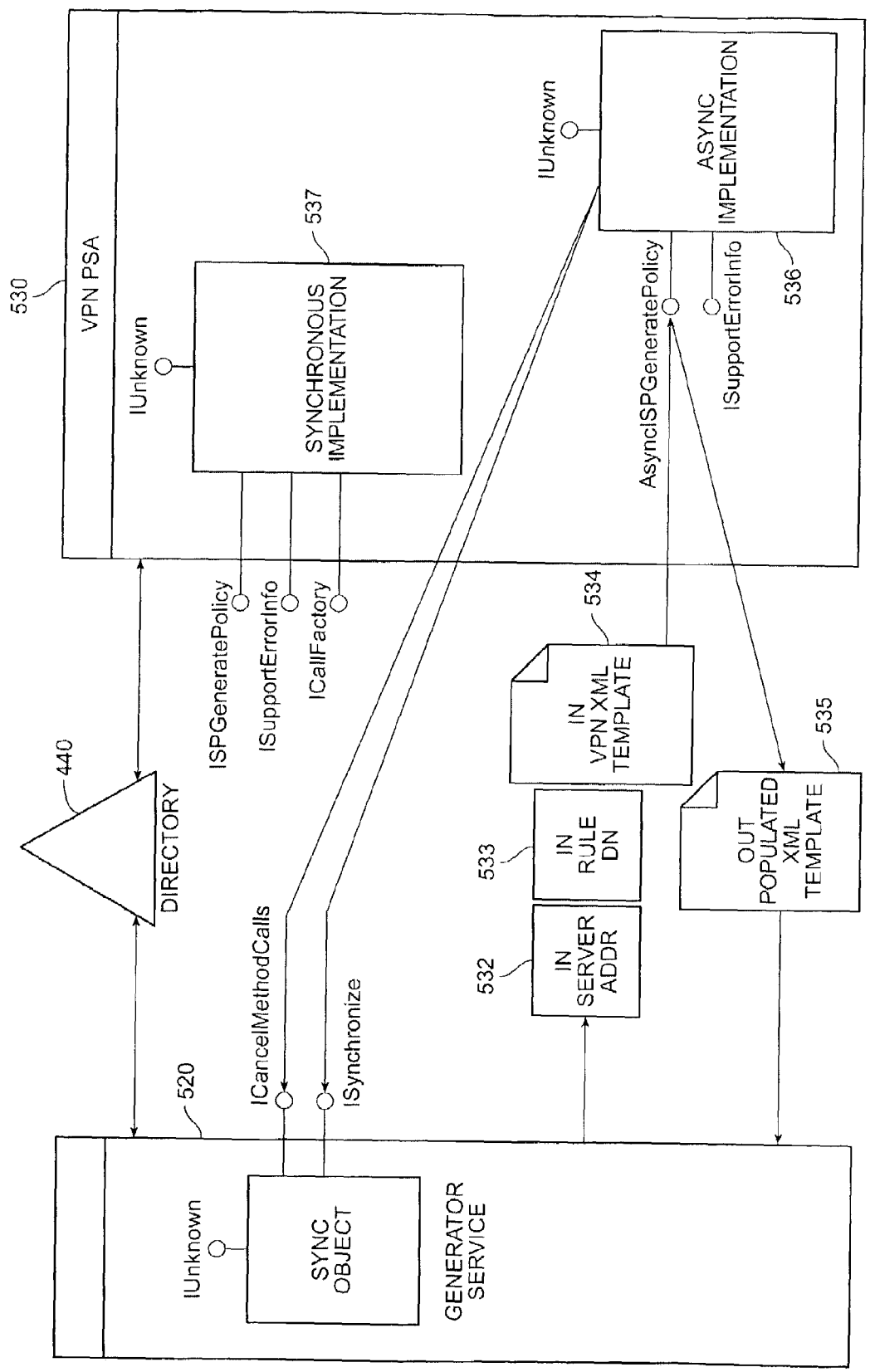
FIG. 6 is a block diagram illustrating the interfaces and information passing through a policy generator and policy service agent according to an embodiment of the invention.

Each of the PSAs have a number of common features, which will be described first. Following will be the individual features of each PSA. FIG. 6 illustrates in more detail the communication between the policy generator 520 and a PSA 530. Generator 520 provides a server address 532, a rule 533, and an XML template 534. PSA 530 accesses directory 440 as needed to populate the XML template. The XML template is returned as a populated template by 35 at the end of the process. PSA 530 implements asynchronous method 536. A synchronous implementation 537 may be implemented as a special case of the asynchronous implementation.

PSA Synchronous Interface: ISPGeneratePolicy

The ISPGeneratePolicy interface is defined by policy generator 420 as the common interface to all the PSAs and is implemented by the PSA framework. The ISPGeneratePolicy interface support rich error handling for all client applications.

The ISPGeneratePolicy interface implements the GenerateXMLSchema routine causing policy generator 420 to

| Registry Value Name | Type | Description |
| --- | --- | --- |
| CLSID | REG_SZ | The Class ID of the PSA component. |
| Policy Rule Type | REG_DWORD | The type of policy rule that this PSA can process. Values for this entry will be defined by the SP-PolicyRule object's type attribute in the Directory. |
| Policy Rule XML Template | REG_SZ | The filename of the XML Template that the Generator should hand into the PSA when initiating policy generation. |

D.2. PSAs

As described above, upon receiving a policy change request from event manager 36, policy generator engine 520 retrieves and, in conjunction with the PSAs, converts hierarchical network policy descriptions stored in the policy schema of directory 440 to service-based, device-neutral request AMS policy generation. This interface is synchronous and blocks for completion of AMS policy generation. The implementation of the routine calls the asynchronous routine AsyncGeneratePolicy and blocks for completion of AMS policy generation. The parameters and a brief description of the ISPGeneratePolicy interface is provided in the table below.

| ISPGeneratePolicy | |
|---|---|
| Method Name | Description |
| HRESULT GenerateXMLSchema([in] BSTR strPolicyRuleDN,<br>    [in] BSTR directoryServerName,<br>    [in] IXMLDOMDocument *pTemplate,<br>    [out] IXMLDOMDocument *pPolicy) | Generates XML policy schema for the Policy Rule specified using the empty XML document template provided. The generated policy will be returned in the XML Policy document. |
| HRESULT CreateCall([in] REFIID riid1,[in] IUnknown* pCtrlUnk,<br>    [in]REFIID riid2,[out] IUnknown** ppv | Creates a call object for the AsyncISPGeneratePolicy interface and assigns a sychronize object to facilitate a non-blocking interface |

PSA Asynchronous Interface: AsyncISPGeneratePolicy

The AsyncISPGeneratePolicy is an asynchronous interface implemented by PSA framework. The interface implements two routines, Begin_GenerateXMLSchema and Finsh_GenerateXMLSchema. The Begin_GenerateXMLSchema routine starts a thread to perform the policy generation and, thereafter, returns to the client. The Finsh_GenerateXMLSchema routine is called to get the result of the policy generation and will block until the generation is completed. The coclass for this interface has a ISynchronize interface as a class member. The ISynchronize interface is defined when the class instance is created by a call to the ICallFactory::CreateCall( ) routine. This interface provides a way for the server to signal completion of the policy generation to the PSA as well as a means for the client to request cancellation of policy generation.

During the XML generation process, the PSA periodically checks to determine if policy generator 420 has requested the PSA to stop processing and to immediately return from the policy generation process; this is accomplished by querying the sychronize interface on the call instance for the ICancelMethodCalls interface and calling the TestCancel( ) routine.

The parameters and a brief description of the AsyncISPGeneratePolicy interface is provided in the table below.

interaction between the various processes within the VPN PSA. This design adheres to that flow.

Back PSA is an in-process COM Server (see the Microsoft Platform SDK) thereby enabling its use both locally as well as remotely (DCOM) via a surrogate process.

VPN PSA 530_1 communicates with policy generator 520 using a custom implementation of asynchronous COM method similar to those used by COM+ and Windows. VPN PSA 530_1 must first register with policy generator 520 to communicate therewith.

Policy generator 420 creates instances of the PSA by using a Call Factory to generate an asynchronous interface.

The PSA accesses and queries Active Directory 440 for all information needed to create a policy. The PSA accepts and uses the server that is passed thereto as a parameter from policy generator 420 to perform queries on. Since different instances of the PSA may access different servers at the same time, the servers are not stored as global static values within the PSAs.

Error Handling and Event Reporting

As noted in FIG. 6, each PSA will implement the interface ISupportErrorInfo. This interface provides a standard way to report more robust information to the caller (the Policy Generator).

| AsyncISPGeneratePolicy | |
|---|---|
| Method Name | Description |
| HRESULT Begin_GenerateXMLSchema([in] BSTR strPolicyRuleDN,<br>    [in] BSTR directoryServerName,<br>    [in] IXMLDOMDocument *pTemplate) | Generates XML policy schema for the Policy Rule specified using the empty XML document template provided. This method will spin a thread and return immediately. |
| HRESULT Finish_GenerateXMLSchema([out] IXMLDOMDocument *pPolicy) | Return a completed XML Policy document. This method will block until policy generation is complete. |
| ISynchronize* GetSync( ) | Returns the ISynchronize object associated with a class instance. |

Each PSA is subordinate to the policy generator 520 and thus only performs as directed thereby. The Policy Generation Data Flow Diagram [2], attached as Appendix B, details In order to provide some type of audit trail, the VPN PSA will also report events and errors to an Event Reporting system. Events to report include Requests from the Generator, dispositions of the request (Success, Failure) and any other information as determined in development (possibly type of conditions within a rule encountered, devices found, etc). Error reporting includes failures that would also be reported to the caller (Policy Generator).

Finally an HRESULT value is returned to the Generator, this also can be used by the Generator to determine the issue that has occurred.

D.3. VPN (Virtual Private Network) PSA

Virtual Private Network (VPN) PSA 530_1 enables a private connection of the user network over a shared public network, e.g., the internet. The VPN PSA interprets and generates Internet Key Exchange (IKE) and IPSEC-based policy information in directory 430 (IPSEC defines a set of protocols and cryptographic algorithms for creating secure IP traffic sessions between IPSEC gateways. The VPN PSA creates policy description on a per-device basis as XML data in a template provided by the policy generator. The template, as populated by the VPN PSA, is returned to the policy generator for storing in the policy store with other policies relating to that device. The VPN policy schema in the directory describes policy conditions such as Access Control Lists (ACL), and policy actions such as IKE settings, Authentication Header (AH) settings and Encapsulating Security Payload (ESP) settings.

Each VPN PSA 530_1 includes a number of processes. Such processes include attaching actions to conditions as well as encoding the actions and conditions into XML based on the VPN Policy XML schema. There are three types of conditions within a rule that define the actions taken by the VPN PSA processes, namely Hub/Spoke, Fully Meshed, and Custom. The VPN Policy Schema defines such conditions using the Net Condition and Aux Net Condition schema objects and generate XML for all such three conditions.

Figure 7:
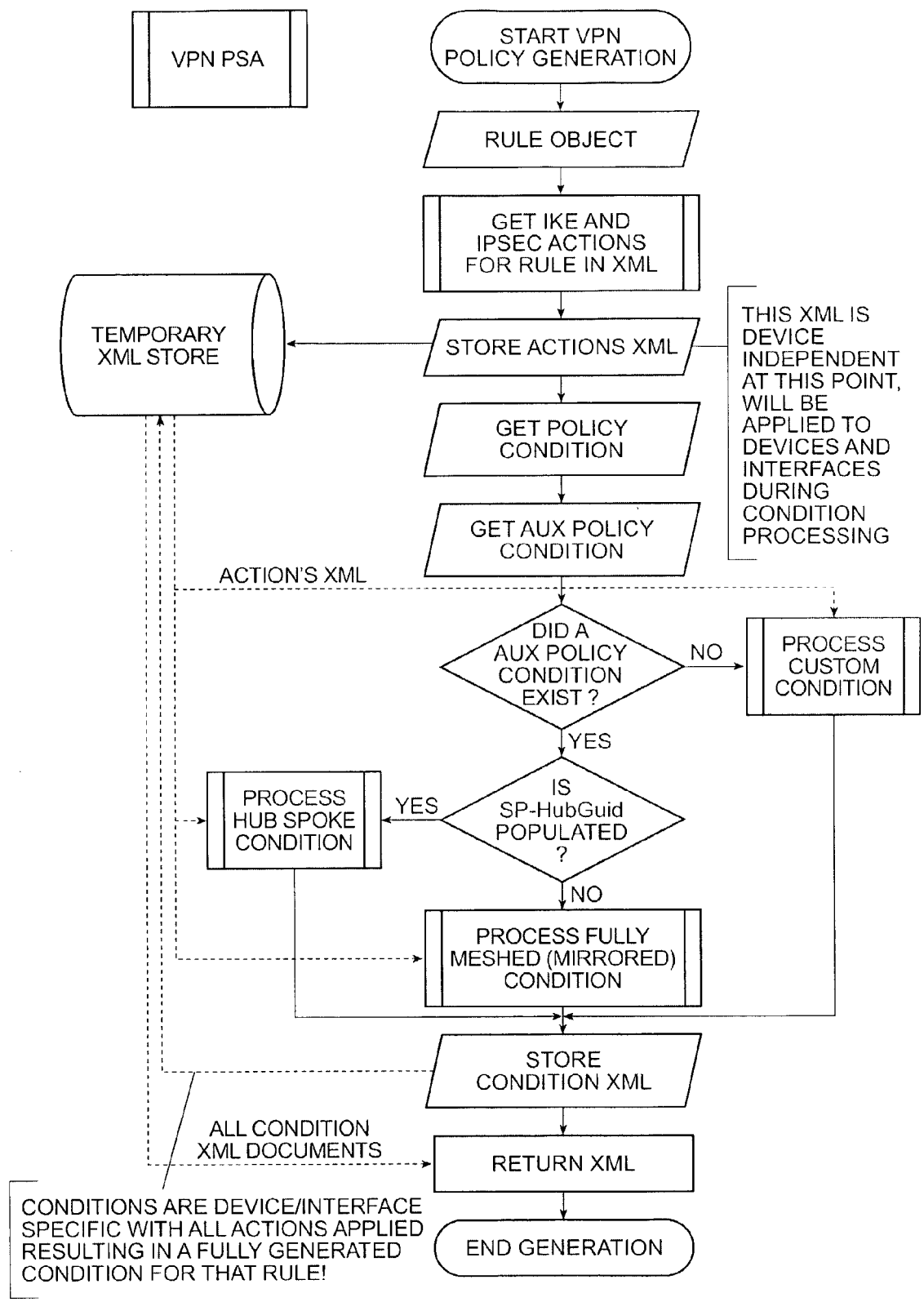
FIG. 7 is a flow chart illustrating the operation of an example PSA, the VPN PSA.

FIG. 7 illustrates the operation of the VPN PSA, as described below.

XML Generation Process

| Get IKE and IPSEC Actions | |
|---|---|
| Input | Rule, Template XML |
| Output | IKE and IPSEC Actions |
| Temporary XML | Partially Populated MAP Segment |
| Description | |

Walks the Action objects related to the Rule within the directory and creates XML containing the IPSEC and IKE actions. It then creates one or more partially populated MAP entries (per IPSEC Action found) that are to be used later for creating the final MAP entries within the document. IKE KEYS are generated per Rule (per generation request - PSA's are rule based) using a random Key Generation Component. The Key is not stored in the directory BUT only generated per generation request!

VPN Condition Handling

Processes diagramed in the VPN Policy Data Flow diagram that produce the Conditions portion of the VPN XML document are described in this section. Conditions include Custom Conditions, Fully Meshed Conditions, and Hub Spoke Conditions.

Each of the conditions are handled using the same processes for ACL and Map generation, however getting to do this requires some structuring of the calls that are made. Noted within each of the "Condition" handling processes below is the fact that calls have to structured to manage the generation correctly. This structuring is basically determining what objects are to be source (or sources) and which objects are to be destination (or destinations) of VPN negotiations and data transfer relationships. Different XML will be generated for each device based on the conditions that determine the relationship.

Note: A Device can contain multiple Interfaces that contain multiple Application Server Groups and groups of each of these can be related to groups of the same or different types. So, we could have a single interface as a Source, and a group of Routers as the Destination.

| Process Custom Condition | |
|---|---|
| Input | Net Condition, Template XML, Partially Populated MAP Segment |
| Output | Fully Generated XML Document possibly containing more than one device |
| Temporary XML | May need a document that Device policy is appended. (Temporary storage) |
| Description | |

Uses the Net Condition object related to the rule to generate a custom condition VPN XML policy (See Policy Schema [4]). By structuring calls to the Generate XML from Source/Destination process, a custom VPN XML policy can be created. Custom Conditions can only relate App Server Groups to App Server Groups based on Action Type(one being SOURCE, the other being DESTINATION)! *Special processing must take place to ALSO generate destination device policy via MAPS (that are from destination to source) and ACLs that look the same as the Source to Destination ACLs generated normally. This is done after normal processing of the Source Device policy.*

| Process HUB/Spoke Condition | |
|---|---|
| Input | Net Condition, Template XML, Partially Populated MAP Segment |
| Output | Fully Generated XML Document possibly containing more than one device |
| Temporary XML | Will need a document that Device policy is appended. (Temporary storage) |
| Description | |

Uses the Aux Net Condition object related to the Rule to generate a Spoke and Hub set of XML device configurations. By structuring calls to the Generate XML from Source/Destination process. Spokes are both generated as a destination and source to and from the. Also the inverse is performed, the Hub is both the Source and Destination to the Spokes. This creates XML per device that will result in a HUB/Spoke relationship. Action Type cannot be used on this scenario because the same Source object will also be referenced as a destination.

| Process Fully Meshed Condition | |
|---|---|
| Input | Net Condition, Template XML, Partially Populated MAP Segment |
| Output | Fully Generated XML Document possibly containing more than one device |
| Temporary XML | Will need a document that device policy is appended. (Temporary storage) |
| Description | |

Uses the Aux Net Condition object related to the Rule to generate a set of XML device configurations allowing mirrored configuration for each participating device.. By structuring -continued calls to the Generate XML from Source/Destination process, each participant gets a chance to be the Source thus producing XML per device allowing each of the other devices to be destinations. Action Type cannot be used on this scenario because the same Source object will also be referenced as a Destination.

Generate XML from Source/Destinaton

| | |
|---|---|
| Input | Template XML, Partially Populated MAP Segment, Source Group of objects, Destination Group of objects |
| Output | A multi-device VPN XML document |
| Temporary XML | Creates Device Specific Document that is passed into sub processes, appends device specific document to output document. |

Description

This is a core piece of the Generation Process. Every Source/Destination Pair (wither it's a Fully Meshed (mirrored), Hub.Spoke, or Custom condition, etc) must be processed by this process. This process determines the type of the source (App Server Group, Interface, Router) and determines how to handle the generation. This process calls appropriate ACL and map generation processes.

Permission XML Generation (ACL's)

Processes that produce the Permission (or ACL) portion of the VPN XML document are described in this section.

ACL for App Server Group (Source)

| | |
|---|---|
| Input | Template XML, Device Specific XML Document (actions have been applied(ipsec and ike) |
| Output | Device Specific XML document with ACLs attached |
| Temporary XML | Source ACL Fragment |

Description

Generates the source portion of the ACL fragment, then passes this fragment to the process that generates the destination portion of the ACL. A Source ACL is created for each port and ip address attached to the App Server Group.

ACL for Interface (Source)

| | |
|---|---|
| Input | Template XML, Device Specific XML Document (actions have been applied(ipsec and ike) |
| Output | Device Specific XML document with ACLs attached |
| Temporary XML | |

Description

Loops through every App Server Group within the Interface and calls the ACL for App Server Group Process.

ACL for Router (Source)

| | |
|---|---|
| Input | Template XML, Device Specific XML Document (actions have been applied(ipsec and ike) |
| Output | Device Specific XML document with ACLs attached |
| Temporary XML | |

Description

Loops through every Interface within the Router and calls the ACL for Interface Process.

ACL for App Server Group (Destination)

| | |
|---|---|
| Input | Source ACL Fragment |
| Output | (possibly) Multiple ACL's fully populated (from temp xml) |
| Temporary XML | Document holding Generated ACLs |

Description

Adds the destination portion for each ip and port attached to the App Server Group.

ACL for Interface (Destination)

| | |
|---|---|
| Input | Source ACL Fragment |
| Output | (possibly) Multiple ACL's fully populated (from temp xml) |
| Temporary XML | Document holding the Generated ACL's |

Description

Loops through each app server group attached to the Interface (only interested in LAN peer types, not WAN peer types) and calls the ACL for APP Server Group process.

ACL for Router (Destination)

| | |
|---|---|
| Input | Source ACL Fragment |
| Output | (possibly) Multiple ACL's fully populated (from temp xml) |
| Temporary XML | Document holding the Generated ACL's |

Description

Loops through each Interface attached to the Router and calls ACL for Interface process.

Device Relationship XML Generation (MAP's)

Processes that produce the Relationships (MAPS) portion of the VPN XML document are described in this section.

Apply MAPs to Interfaces (Source to Dest)

| | |
|---|---|
| Input | Device Specific document with Actions applied, ACL's applied. Also the partially populated MAP segment. |
| Output | Device Specific document with maps attached. |
| Temporary XML | MAP segment that identifies the Interface, built from the partially populated MAP segment |

Description

Loops through the peertype = WAN interfaces from the source's router, used the MAP segments passed in and attached an interface, then passes this on the appropriate peer resolving process.

Resolve MAP from App Server Group

| | |
|---|---|
| Input | Map segment |
| Output | Fully populated MAP segment(s) if more than one destination |
| Temporary XML | Document to hold MAPs generated |

| -continued |
|---|
| Description |
| Gets the App Server Groups Router, loops through the interfaces looking for WAN interfaces, creates a copy of the MAP Segment applies the peer to append to returnable document. |

| Resolve MAP from Interface | |
|---|---|
| Input | Map Segment |
| Output | Fully populated MAP segment(s) if more than one destination |
| Temporary XML | Document to hold MAPs generated |

| Description |
|---|
| Gets the Interface Router, loops through the interfaces looking for WAN interfaces, creates a copy of the MAP Segment applies the peer to append to returnable document. |

| Resolve MAP from Router | |
|---|---|
| Input | Map Segment |
| Output | Fully populated MAP segment(s) if more than one destination |
| Temporary XML | Document to hold MAPs generated |

| Description |
|---|
| Loops through the interfaces looking for WAN interfaces, creates a copy of the MAP Segment applies the peer to append to returnable document. |

Applying ACLs, Actions to Relationships

Processes that apply actions to portion of the VPN XML document are described in this section.

| Apply ACLs Actions to MAPS | |
|---|---|
| Input | Generated MAPs, Generated ACLs, Device Specific Document |
| Output | Device Specific Document with everything applied |
| Temporary XML | |

| Description |
|---|
| Attaches the ACL's to the MAPS generated, applies the MAPS to the Device Document, applies any other actions as needed. |

D.4 NAT (Network Address Translation) PSA

A network address translation (NAT) PSA 530-2 provides policy for translating local (internal) IP network addresses to remote (external) IP addresses used by devices outside the internal network. The NAT policy schema describes processing rules for passing traffic between external and internal IP addresses and translating traffic from one set of IP addresses to another.

NAT PSA 530_2, in conjunction with policy generator 520, receive and evaluate NAT policy descriptions in policy schema of directory 440, and, in response, generate service-based device-neutral NAT policy data, and, thereafter, store the generated policy data in the NAT section of each associated managed device in policy store 430.

The NAT policy schema in directory 440 establishes rules for transferring data between external and internal IP addresses and translating such data from one set of IP addresses to another.

NAT Directory Schema
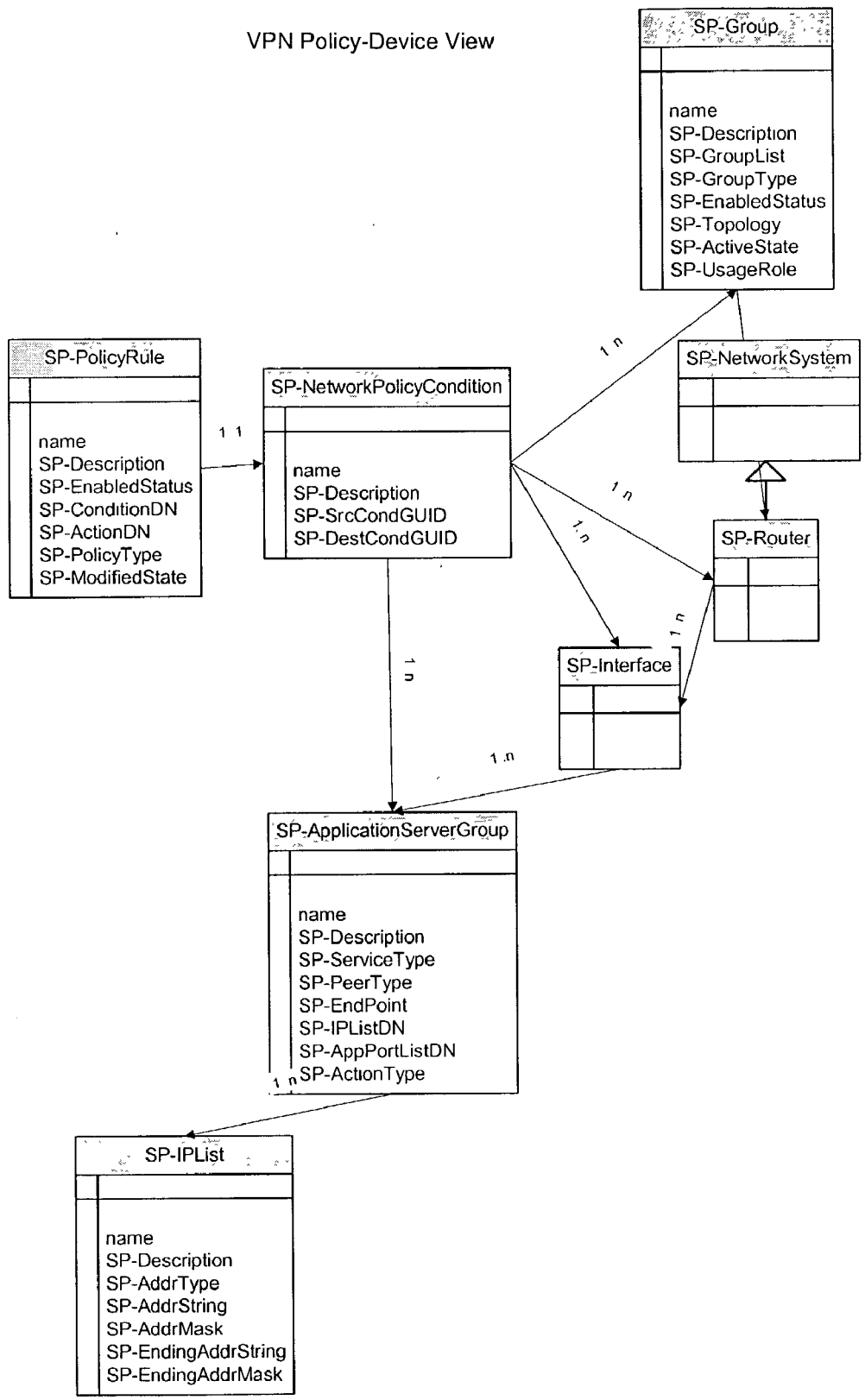

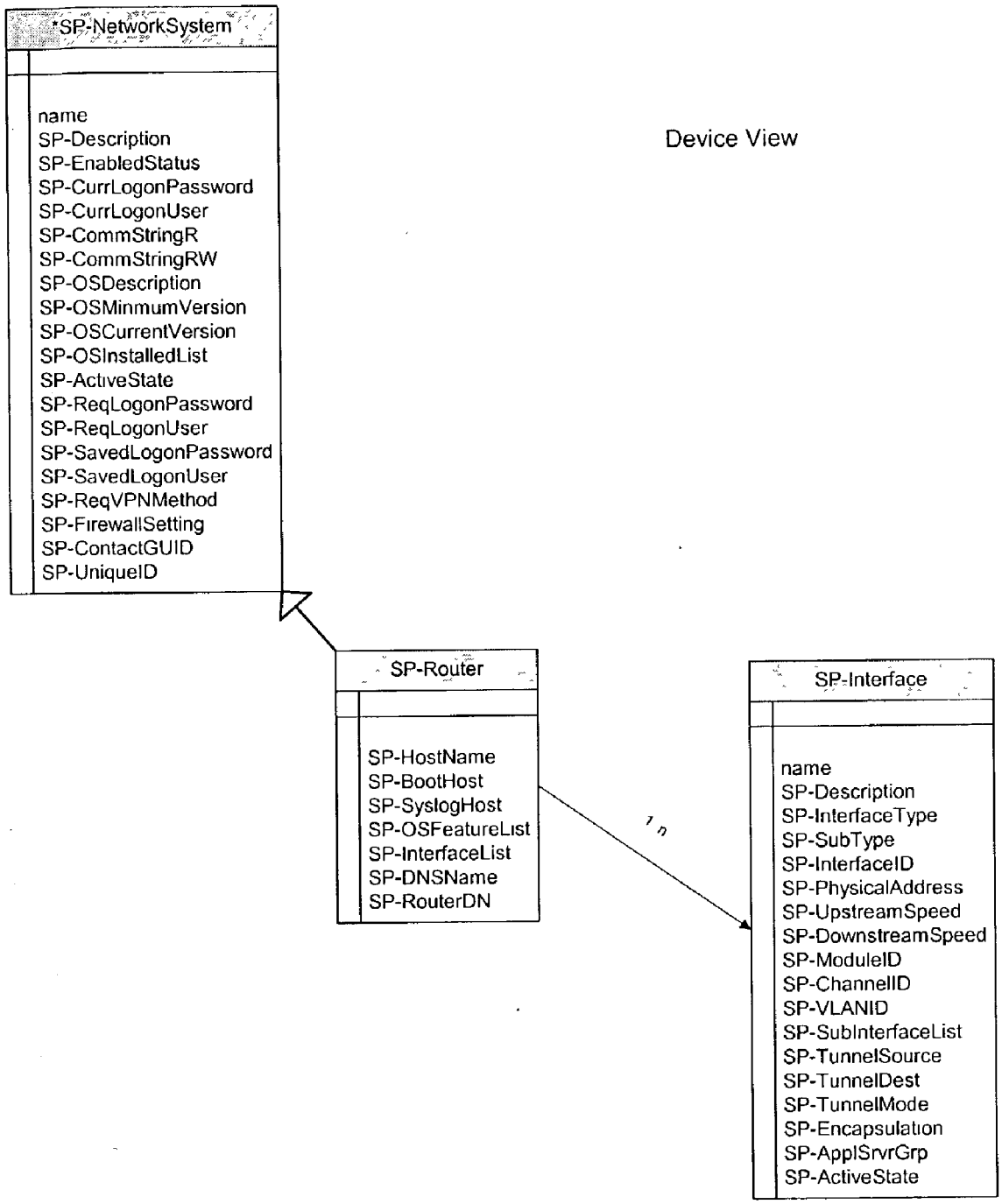
Device View

Device XML Schema

| Structure | Values |
|---|---|
| SP-Device | |
|   xmlns | x-schema.deviceSchemav0.4.xml |
|   xmlns:SP-DeviceSchema | deviceSchemav0.4.xml |
|   guid | DeviceABC |
|   SP-AVPairs | |
|   SP-UsageRole | |
|   SP-VendorModel | |
|   SP-Policies | |
|     SP-Policy | |
|     SP-Policy | |
|     SP-Policy | |
|       guid | Policy3 |
|       priority | 3 |
|       SP-PolicyRule | |
|         type | NAT |
|         SP-AccessLists | |
|           SP-AccessList | |
|             guid | ACL2 |
|             SP-Action | |
|             SP-Protocol | |
|             SP-SourceType | |
|             SP-Source | |
|             SP-SourceWildcard | |
|             SP-SourceEnd | |
|             SP-SourceEndWildcard | |
|             SP-SourcePorts | |
|             SP-DestType | |
|             SP-Destination | |
|             SP-DestWildcard | |
|             SP-DestEnd | |
|             SP-DestEndWildcard | |
|             SP-DestPorts | |
|         SP-Interfaces | |
|           SP-Interface | |
|             guidString | Interface1 |
|             baseConfigName | Serial0 |
|             SP-EndPoint | |
|             SP-PeerType | |
|             SP-NATType | |
|             SP-AccessListRefs | |
|               SP-AccessListRef | |
|                 guidref | ACL2 |

Processing Policy Rules

In one embodiment, the directory is navigated to gather the information needed to populate the device XML schema so it can be stored in the Configuration Store for later retrieval and application by the various Device Plugs-Ins (DPIs). The NAT configuration consists of defining interfaces and processing rules.

Interfaces are denoted as either inside (i.e. private, or LAN facing), or outside (i.e. public, or WAN facing). Processing rules determine how the translation occurs. In one embodiment, only supports inside source NAT (only applying NAT to traffic originating from the LAN), and we will only support the overloading of the WAN port interface address rather than an external address pool.

Generally, NAT is applied to all traffic moving from an inside interface to an outside interface. However, on some platforms (e.g. Cisco) processing rules can include Access Control Lists (ACLs) to provide finer control over which traffic to apply NAT to.

When the Policy Generator kicks off a NAT PSA, it hands it an SP-PolicyRule (refer to Directory schema diagrams above). This maps directly to an SP-NetworkPolicyCondition.

Application Server Groups (A.K.A. Service Entry Points) are the focal point of NAT definition. So, there is a navigation to get from SP-NetworkPolicyCondition to SP-ApplicationServerGroup.

Each SP-Interface contains a pointer to a default SP-ApplicationServerGroup (ASG). The default ASG contains authoritative information about the interface—namely whether it's a WAN or LAN interface, stored in the SP-PeerType attribute.

So, identifying LAN and WAN interfaces is accomplished by navigating from an SP-NetworkPolicyCondition to an SP-ApplicationServerGroup (which may involve traversing through SP-Router and/or SP-Interfaces instances). The SP-PeerType attribute of the ASG corresponds to the same named attribute of the SP-Interface element of the device XML Schema. Likewise, the ASG's parent SP-Interface's name attribute corresponds to the baseConfigName attribute of the SP-Interface element in the device XML Schema.

Now, the ACLs are built for traffic identification; for each ASG, if the SP-ServiceType=NAT (this will only be true for LAN interfaces), the address information pointed to by the SP-IPListDN attribute will be collected. Then the resulting address info will be normalized, removing duplicates, overlaps, etc. Finally, the result will be converted to the SP-AccessList notation in the device XML schema. Source Ports and Destination Addresses and Ports will not be used.

Using the SP-AccessListRef attributes, ACLs will be associated with LAN interfaces in the device XML schema.

Data Navigation

In the course of its work the NAT PSA needs to be aware of situations that may lead to incorrect XML generation. In the process of populating an XML template, the PSA may, for example, discover missing or incomplete information in the directory. Or, the XML template may be incomplete or damaged. The enumeration of these situations needs to be completed.

In such cases, the NAT PSA will return an error to the Policy Generator, and also report it to the Event Reporting system, providing enough detail and context that identification and resolution can be performed.

D.5 Firewall PSA

Firewall PSA 530-3 interprets and generates firewall policy from directory 440. The firewall policy schema contains information related to Context-Based Access Control (CBAC), denial-of-service hosting prevention, IP spoofing prevention, and Intrusion Detection (IDS). This information is optionally encoded as a set of firewall (templates) which may be used to select different settings of the above firewall features.

Firewall PSA 530_3, in conjunction with policy generator 520, receive and evaluate firewall policy descriptions in policy schema of directory 440, and, in response, generate service-based device-neutral firewall policy data, and, thereafter, store the generated policy data in the firewall section of each associated managed device in policy store 430.

The firewall policy schema establishes rules related to Context-Based Access Control (CBAC), Denial-of-Service Hosting prevention, IP Spoofing prevention, and Intrusion Detection (IDS). This information is optionally encoded as a set of firewall templates which may be used to select different configurations of the above firewall features.

Context Based Access Control (CBAC)

CBAC is a firewall feature available on Cisco routers, which when enabled does stateful packet inspection at the TCP and UDP level and also at application level (specific applications need to be specified when configuring CBAC). When inspection is enabled on an interface in a particular direction (incoming or outgoing), all the traffic coming in the direction of inspection is inspected and dynamic holes are opened for the particular protocol/application traffic. Typically the traffic from the trusted network always passes out of the network, where as the reverse traffic into the trusted network is passed only in response to previous traffic originating from the trusted network. The router maintains state for every protocol/application traffic initiated from the trusted network and dynamically opens holes, transparent to the application, hence the name "Context Based" Access Control.

CBAC will be applied on the internal interface. Different applications/protocols in CBAC will be enabled based on the Security Level setting for the Router in the Active Directory. See Table 2 for details.

All the service points for which a VPN tunnel is created need to have complete access to the trusted network. Special ACLs (Access Control Lists) will be created to permit traffic originating from all the remote service points and destined to the trusted network. The VPN policies for provisioning IPSEC (for service point being a Cisco router) and L2TP (for service point being a Windows Edge Device) will be walked through by the Firewall PSA in order to find the IP addresses of the service points.

DoS Hosting Prevention

Denial of Service (DoS) attacks are often initiated by taking control of a host in a trusted network and sending spoofed IP packets from that host. Dos Hosting prevention is typically applied on an Internal Interface and permit rules are applied to permit all the traffic originating from the trusted network and denying all the other addresses.

The list of trusted addresses will be obtained by walking the Active Directory to obtain IP addresses of all the Application Server Groups connected to the Internal interface for a particular Router and applying permit ACLs with the source address as the address of the Interface and destination address 'any'. The ACLs will be applied to the Internal interface.

IP Spoofing Prevention

IP Spoofing attacks often occur from outside of a trusted network by spoofing an IP packet with a source address from the trusted network. The best way to prevent this attack is to block all incoming traffic on the External Interface whose source IP address is that from the trusted network. Cisco Routers also have a feature called Unicast Reverse Path Forwarding (RPF). This feature checks each packet that is routed into router. If the source IP address does not have a route in the CEF tables that points back to the same interface on which the packet arrived, the router drops the packet. Enabling this feature on the Router also prevents IP spoofing attacks. The Unicast RPF feature won't be used for Phase 1 as there are problems with this implementation in Cisco Routers.

IP spoofing prevention will be applied on the External Interface. The list of trusted addresses for which a deny ACL has to be generated will be obtained by walking the Active Directory to obtain IP addresses of all Application Server Groups connected to the Internal Interface for a particular Router.

Intrusion Detection System (IDS)

The IDS on Cisco Routers detects 59 different intrusion signatures in IP packets. This feature is applied to an Interface in a particular direction.

A walk will be performed on all the Service points in the VPN Policy to get to the participating Routers and the IDS will be applied on the External interface in the incoming direction.

Table 1 lists the Firewall features and the Interfaces to which they will be applied

TABLE 1

| Functionality | Interface Applied On |
| --- | --- |
| CBAC | Internal |
| DoS Hosting Prevention | Internal |
| IP Spoofing Prevention | External |
| IDS | External |

The user-choice for setting firewall functionality is Low, Medium or High. The SP-FirewallSetting element of the SP-NetworkSystem class in Active Directory will represent this functionality. Following table shows the Firewall features that will be turned on for various settings:

TABLE 2

| SP-FirewallSetting | Security Level | CBAC | DoS Hosting Prevention | IP Spoofing Prevention | IDS |
| --- | --- | --- | --- | --- | --- |
| 1 | High | Inspect using CBAC-TCP, UDP, FTP, SMTP, TFTP, HTTP, UNIX-R (such as rlogin, rexec, rsh), CU-SeeMe, H.323, Microsoft Netshow, RPC (only Sun RPC), SQL*Net, StreamWorks, VDOLive | Yes | Yes | Yes |
| 2 | Medium | Inspect using CBAC-TCP, UDP, FTP, SMTP, TFTP, HTTP | Yes | Yes | Yes |
| 3 | Low | Inspect using CBAC-Generic TCP and UDP | Yes | Yes | No |

Data Validation

In the course of its work the Firewall PSA needs to be aware of situations that may lead to incorrect XML generation. In the process of populating an XML template, the PSA may, for example, discover missing or incomplete information in the directory. Or, the XML template may be incomplete or damaged. The generated XML will be verified against the XML schema for validation.

In such cases, the Firewall PSA will return an error to the Policy Generator, and also report it to the Event Reporting system, providing enough detail and context that identification and resolution can be performed.

D.6 Application Management System (AMS) PSA

Application Management System (AMS) PSA 530-4 interprets and generates AMS policy from directory 440. AMS allows users to organize application activities into hierarchical structures that support the execution start-up and shutdown of synchronized activities, based on user-defined policies. For example, an application activity can be executed, suspended, resumed and terminated. Activity states can be monitored. If an activity (or node) fails, several recovery policies can be applied. For instance, in case of node failure, an application can be restarted on an alternative node. The AMS policy schema contains information related to software application policy, such as management device embedded software versioning and update information.

AMS PSA 530_4, in conjunction with policy generator 520, receive and evaluate AMS policy descriptions in policy schema of directory 440, and, in response, generate service-based device-neutral AMS policy data, and, thereafter, store the generated policy data in the AMS section of each associated managed device in policy store 430.

The AMS policy schema establishes rules related to software application policy, such as versioning and updating software embedded in a managed device.

As stated above, the AMS PSA is a free threaded in-process COM server and communicates using PSA framework interface which supports asynchronous as well synchronous methods of communication, as described below.

Using the XMLDOM and AMS XML Document

The Policy Generator passes an IXMLDOMDocument interface containing a fully decorated AMS XML document to be used as a template. The template contains a container of policy rules with an empty AMS policy rule entry that the Policy Generator understands. Pieces of the template, as needed, will be copied using the CloneNode( ) method in the XMLDOM then populated and stored into a separate instance of the XMLDOM. The second, separate instance of the XMLDOM will be the container of the XML encoded AMS Policy containing entries for all devices associated with the rule being processed. At the conclusion of the AMS XML generation, all sections of the template must have been copied. Other instances of the XMLDOM may be created and used internally as needed for holding fragments of AMS Policy, however, the XMLDOM instances should be kept at minimum to reduce overhead.

Segments/Pieces of the template (as noted above) will need to be selected from the template and copied when generating the AMS XML for each device in a policy rule. Selection of the segments is accomplished using the XSL pattern matching syntax and the SelectNodes( ) or SelectSingleNode( ) methods.

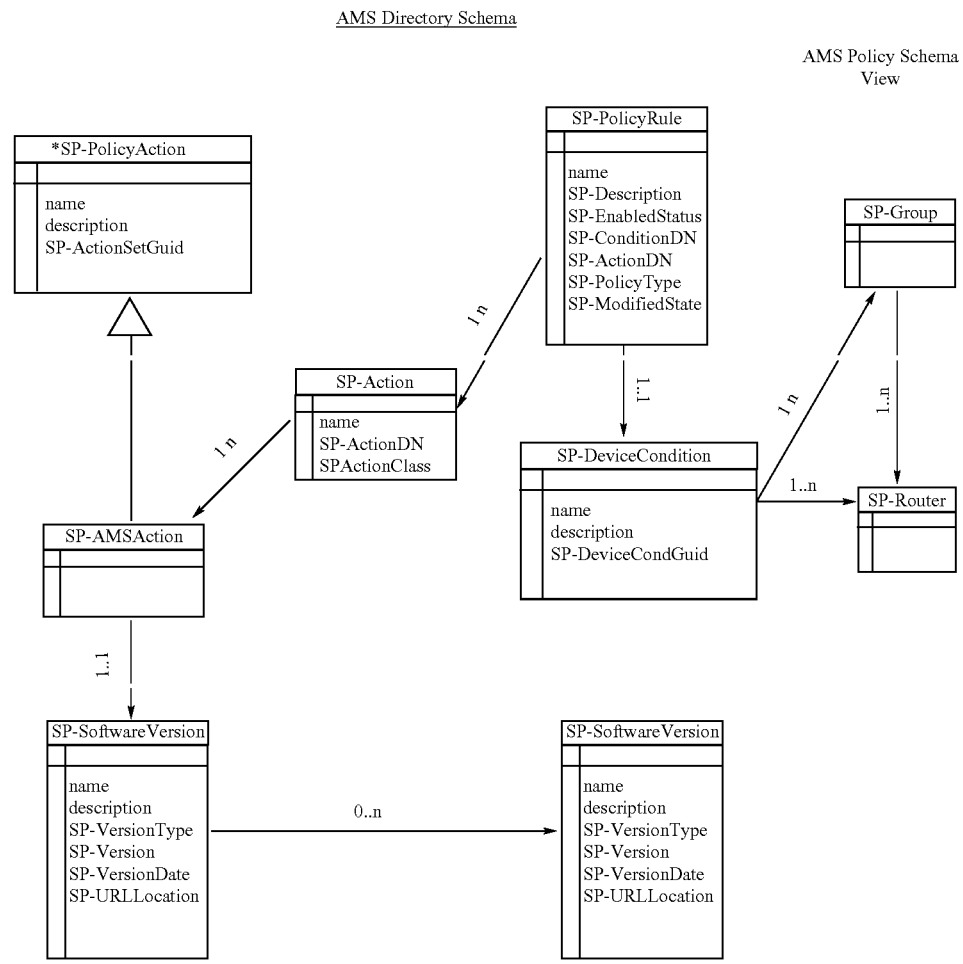

AMS Conditions

The condition DN list on a policy rule object references a SP_DeviceCondition object for AMS policy. The CAMSConditions class will be defined to retrieve the SP_DeviceCondition object and iterate through the deviceGuid attribute for all devices and/or group objects containing other devices for which to generate XML policy.

CAMSConditions

| Method Name | Description |
| --- | --- |
| CAMSConditions(BSTR bstrServer) | Constructor |
| HRESULT Generate(IADs* pPolicyRule, IXMLDOMDocument *pFinalDoc, | Generates XML policy schema for all devices in |

-continued

CAMSConditions

| Method Name | Description |
| --- | --- |
| IXMLDOMDocument *pActionsDoc) | the device conditions directory object. Each device will get the exact same policy actions set passed in the parameter list. |
| CComBSTR m__bstrServerName | Name of the directory server to retrieve policy information. |

AMS Actions

The class CAMSActions will be defined to process SP_AMSAction objects, which define the actions defining AMS policy. The SP_AMSAction objects only reference SP_SoftwareVersion objects, which define software versioning requirements for a device. An AMS action object can reference only one SP_SoftwareVersion object representing a components base software version. Each SP_SoftwareVersion object can have one to many SP_SoftwareVersion objects representing updates to get to the parent objects base version. Multiple SP_AMSAction objects can be referenced by the policy rule object in order to model multiple software components for versioning.

| CAMSActions | |
|---|---|
| Method Name | Description |
| CAMSActions(BSTR bstrServer, IXMLDOMDocument pTemplate) | Constructor |
| ~CAMSActions( ) | Destructor |
| HRESULT Generate(IADs* pPolicyRule, IXMLDOMDocument *pFinalDoc) | Iterates through the Action objects pointed to by the policy rule and facilitates generation of AMS policy for all Actions objects of class type AMS. |
| HRESULT ProcessAMSSoftware(IADs* pPolicyRule, IXMLDOMDocument *pFinalDoc) | Binds to the AMS software Action set and generates XML from the software version object attributes. |
| HRESULT CheckForUpdates(IADs* pPolicyRule, IXMLDOMNode *pBaseSoftwareNode) | Software updates are contained by a parent software object. This method checks for a processes any software version objects that would be updates to the current version. |
| CComBSTR m_bstrServerName | Name of the directory server to retrieve policy information. |
| CComPtr<IXMLDOMDocument> m_spTemplate | Pointer to the AMS XML template |

D.7 Policy Fetcher

Policy fetcher 540 provides an interface between policy store 430 and the device plug-ins (DPI) 610 in layer 600. Policy fetcher 540 retrieves configurations and policy information of the managed devices from policy store 430 and supplies them to DPIs 610.

After storing the new network policy for a managed device, policy generator 510 so notifies the managed device's associated device plug-in via event manager 36. Thereafter, policy fetcher 540 transfers the XML policy data to corresponding device plug-ins in device plug-in layer 600 which, in turn, translate the data to device-specific configuration data and deliver the translated data to their associated managed devices.

D.8 Authorization/Key Manager

Authentication/key manager 550 manages passwords and pre-shared authentication keys required to access the managed devices. Any module in system 10 (e.g., bulk loader 340 in layer 300 or Cisco DPI in layer 700) requiring access to a managed device, acquires the device's associated password or keys from authentication/key manager 550. In other words, authentication/key manager 550 has exclusive access to a managed device's security information—stored in policy store 430—and passes the security information to a module requesting such access. Authentication/key manager 550 supports both push-type devices—which are unable to request policy information and thus policies must be pushed onto them—as well as pull-type devices, that may request to receive a policy.

D.9. Status Tracking System

Status tracking system 560 supplies policy store 430 and directory 440 with updates pertaining to base configuration data and policy deployment as well as password changes of the managed devices.

Status tracking system 560 tracks the activities of policy generator 510 to ensure proper adoption of selected policies and configuration data by the managed devices. Assume, for example, that one of the managed devices is configured properly, but during the configuration of a second managed device, e.g. a power outage occurs. Status tracking system 560, tracks the configuration process and thus records the disruption due to the power outage for future correction.

Because the service-based policy engine layer 500 is separated from the presentation layer 200 by the intermediate layers 300 and 400, in accordance with the present invention, users are insulated from enhancement/modification activities occurring in policy engine layer 500 and thus will not be subjected to any disruption as a result of system 10 enhancement/modification. For example, assume that additional network are desired to be added to those already under system 10's management. Such additions, which would require developing new PSAs and other supporting and related modules in the policy engine layer 500, are invisible to a system 10 user. The separation of policy engine layer 500 from the presentation layer 200 enables any enhancement in policy engine layer 500 to remain undisclosed to one or more users for a desired length of time when e.g. another user has entered into an exclusive use of that service.

Policy deployment by policy generator 510 is carried out in three different ways. First, a user may, after selecting his/her desired work polices via the SAI 310, deploy the selected policies by pressing a submit button, in which case, policy generator 20 shortly thereafter begins to carry out its functions. Second, The user may store the selected policies, log in to the system at some future time to deploy the polices. Third, a user may select and submit policies but request that the policy implementation be held in abeyance until such times as specified by the user.

What is claimed:

1. A method for generating network management policies for a network, comprising:
   storing a hierarchical policy in a directory database;
   transforming said hierarchical policy into a flat file format with device schema for devices comprising said network; and
   storing said flat file format device schema in a configuration database.

2. The method of claim 1 further comprising:
   concatenating together device implementations of a plurality of policies for said devices.

3. The method of claim 1 wherein said transforming comprises:
   dividing a policy into a plurality of policy types; and
   providing each of said policy types to a specialized process for one of said policy types, said specialized processes generating a flat file for each device corresponding to said policy.

4. The method of claim 3 wherein said process is a COM server.

5. The method of claim 3 wherein said policy types include a virtual private network (VPN), a network address translation (NAT), a firewall and application management services (AMS).

6. The method of claim 3 wherein said dividing is performed by a policy generator, said policy generator further:
   providing a flat file template to said processes for populating with data corresponding to said policy; and
   providing to said processes a server address for a server containing said directory.

7. The method of claim 3 wherein said dividing is performed by a policy generator, said policy generator further:
   adding device attributes from said directory to said flat file.

8. The method of claim 3 wherein said dividing is performed by a policy generator, said policy generator further:
   providing a main thread; and
   providing a policy generation thread pool comprised of threads generated by said main thread, each thread in said thread pool being responsible for policy for a particular policy object.

9. A method for generating network management policies for a network, comprising:
   storing a hierarchical policy in a directory database;
   using a policy generator to transform said hierarchical policy into a flat file format with device schema for devices comprising said network by
   dividing a policy into a plurality of policy types, and
   providing each of said policy types to a COM server for one of said policy types, said COM server generating a flat file for each device corresponding to said policy, wherein said policy types include a virtual private network (VPM), a network address translation (NAT), a firewall and application management services (AMS);
   providing a flat file template to said COM servers for populating with data corresponding to said policy; and
   providing to said COM servers a server address for a server containing said directory;
   concatenating together device implementations of a plurality of policies for said devices;
   adding device attributes from said directory to said flat file; and
   storing said flat file format device schema in a configuration database.

10. The method of claim 9 further comprising:
    managing passwords and encryption keys in an authorization/key manager separate from said COM servers, and responsive to calls from said COM servers, to provide consistent passwords and encryption keys.

11. The method of claim 9 wherein said flat file format is XML, and said concatenating is performed using an XSL stylesheet.

12. The method of claim 9 wherein said policy generator comprises multiple instantiations on multiple servers.

13. The method of claim 9 further comprising:
    providing said schema in XML format;
    storing said schema in said configuration database using an ADO object pool in communication with an OLEDB provider.

14. A method for creating a directory of a network, comprising:
    providing a directory of device objects describing a plurality of devices in a network;
    organizing said directory in hierarchical form; and
    providing at least one policy object for application of a policy to a plurality of said devices.

15. The method of claim 14 wherein said policy object is one of a plurality of policy objects including policy objects for security policy, firewall policy, network policy and router configuration.

16. A method for generating network management policies for a network, comprising:
    dividing a policy into a plurality of policy types; and
    providing each of said policy types to a specialized process for one of said policy types, said specialized processes generating a flat file for each device corresponding to said policy.

17. The method of claim 16 wherein each said specialized process is a COM server.

18. The method of claim 16 wherein said policy types include a virtual private network (VPN), a network address translation (NAT), a firewall and application management services (AMS).

19. The method of claim 16 wherein said dividing is performed by a policy generator, said policy generator further:
    providing a flat file template to said processes for populating with data corresponding to said policy; and
    providing to said processes a server address for a server containing said directory.

20. The method of claim 16 wherein each of said specialized processes is a COM server, each of said COM servers performing the following:
    accessing a directory for information needed to create a policy;
    providing both synchronous and asynchronous implementations.

21. A computer readable media having computer readable code embodied therein for providing a directory of network resources comprising:
    a plurality of objects describing attributes of said network resources; and
    a plurality of objects describing attributes of network policy.

22. The media of claim 21 wherein said attributes of network policy include:
a virtual network policy;
a network address policy;
a firewall policy; and
an application management system policy.

23. The media of claim 21 wherein at least one of said objects sets forth the connections in a network.

24. The media of claim 21 wherein at least one of said objects is an actions object with a list of actions, and the type of action.

25. The media of claim 21 wherein at least one of said objects is an interface object with an indication of type or location, and networking relevant information.

26. A method for generating policy descriptions with a policy service agent responsive to a policy generator comprising:

receiving an XML template, a policy rule description and a directory address from said policy generator;

accessing a directory at said directory address for hierarchical data describing said policy rule;

populating said XML template with data pertaining to said policy rule for a device identified in said XML template;

returning a populated XML template to said policy generator.

27. The method of claim 26 wherein said policy generator is a COM server.

28. The method of claim 26 wherein said policy service agent includes an asynchronous COM interface with said policy generator.

* * * * *